US008260923B2

(12) United States Patent
Shinohe et al.

(10) Patent No.: US 8,260,923 B2
(45) Date of Patent: Sep. 4, 2012

(54) ARRANGEMENTS TO IMPLEMENT A SCALE-UP SERVICE

(75) Inventors: Ichiro Shinohe, Yokohama (JP); Ayumi Takizawa, Machida (JP); Yoshifumi Takamoto, Kokubunji (JP); Daisuke Sasaki, Ebina (JP); Hiroyuki Igata, Yamato (JP); Shinya Takuwa, Habikino (JP)

(73) Assignee: Hitachi, Ltd., Tokyo (JP)

( * ) Notice: Subject to any disclaimer, the term of this patent is extended or adjusted under 35 U.S.C. 154(b) by 723 days.

(21) Appl. No.: 11/288,107

(22) Filed: Nov. 29, 2005

(65) Prior Publication Data

US 2006/0143255 A1 Jun. 29, 2006

Related U.S. Application Data

(63) Continuation-in-part of application No. 11/060,424, filed on Feb. 18, 2005, now abandoned.

(30) Foreign Application Priority Data

Apr. 30, 2004 (JP) ................ 2004-136095
Apr. 28, 2005 (JP) ................ 2005-133681

(51) Int. Cl.
*G06F 15/173* (2006.01)
*G06F 15/16* (2006.01)
(52) U.S. Cl. .............. 709/226; 709/203; 709/223
(58) Field of Classification Search ............ 709/226, 709/203, 220–222
See application file for complete search history.

(56) References Cited

U.S. PATENT DOCUMENTS

| 2004/0015581 | A1* | 1/2004 | Forbes ............ 709/224 |
| 2004/0054780 | A1 | 3/2004 | Romero |
| 2004/0143729 | A1* | 7/2004 | Bouchier et al. ............ 713/100 |
| 2004/0267920 | A1 | 12/2004 | Hydrie et al. |
| 2005/0010918 | A1 | 1/2005 | Childs et al. |
| 2005/0053057 | A1 | 3/2005 | Deneroff et al. |
| 2005/0256942 | A1* | 11/2005 | McCardle et al. ............ 709/220 |

FOREIGN PATENT DOCUMENTS

| JP | 2004-100791 | 4/2004 |
| JP | 2004-110791 | 4/2004 |

OTHER PUBLICATIONS

Haruki Inoue, "Blade Server ga yubisasu 2010nenno computer zou", SolutionIT, RIC Telecom, Mar. 1, 2004, pp. 1-11.
"BladeSymphony", Hitachi Ltd., Oct. 1, 2004, p. 7 to 10.

* cited by examiner

*Primary Examiner* — Kenny Lin
*Assistant Examiner* — Shripal Khajuria
(74) *Attorney, Agent, or Firm* — Antonelli, Terry, Stout & Kraus, LLP.

(57) ABSTRACT

A server system has a blade system formed of a plurality of servers that are mounted in one or a plurality of stages within a single chassis so as to have a plurality of different functions, and a management server for managing said blade system. The management server has means for grouping the plurality of mounted servers to manage for each function, means for managing the deployment of the plurality of servers within the chassis, and deployment changing means for changing the functions of the plurality servers and transposing the functions to change the deployment of the servers within the chassis. Thus, the deployment changing means makes the servers of each of the plurality of functions be arrayed in regular order within the chassis.

15 Claims, 33 Drawing Sheets

FIG. 3

| NUMBER ⌐201 | TYPE ⌐202 | LED ⌐203 | DETECTION MODULE 1 ⌐204 | --- | DETECTION MODULE n ⌐205 |
|---|---|---|---|---|---|
| 1 | WEB SERVER | GREEN | WEB SERVER MODULE 1 | --- | WEB SERVER MODULE n |
| 2 | MAIL SERVER | RED | MAIL SERVER MODULE 1 | --- | MAIL SERVER MODULE n |
| ⋮ | ⋮ | ⋮ | ⋮ | ⋮ | ⋮ |

FIG. 4

| NUMBER ⌐301 | BLADE NUMBER ⌐302 | TYPE ⌐303 | STATUS ⌐304 | POSSIBLE FUNCTION TYPE ⌐305 |
|---|---|---|---|---|
| 1 | BLADE 1 BLADE SERVER 1 | WEB SERVER | act | MAIL SERVER |
| 2 | BLADE 1 BLADE SERVER 2 | MAIL SERVER | act | WEB SERVER |
| 3 | BLADE 1 BLADE SERVER 3 | FREE | non act | MAIL SERVER WEB SERVER |
| 4 | BLADE 1 BLADE SERVER 4 | FREE | non act | |
| 5 | BLADE 2 BLADE SERVER 1 | WEB SERVER | act | |
| 6 | BLADE 2 BLADE SERVER 2 | MAIL SERVER | ⋮ | |
| 7 | BLADE 2 BLADE SERVER 3 | MAIL SERVER | ⋮ | |
| 8 | BLADE 2 BLADE SERVER 4 | WEB SERVER | ⋮ | |

| NUMBER | TYPE |
|---|---|
| 1 | WEB SERVER |
| 2 | WEB SERVER |
| 3 | WEB SERVER |
| 4 | MAIL SERVER |
| 5 | MAIL SERVER |
| 6 | MAIL SERVER |
| 7 | FREE |
| 8 | FREE |

| | TYPE |
|---|---|
| 1 | WEB SERVER |
| 2 | MAIL SERVER |
| 3 | WEB SERVER |
| 4 | MAIL SERVER |
| 5 | WEB SERVER |
| 6 | MAIL SERVER |
| 7 | FREE |
| 8 | FREE |

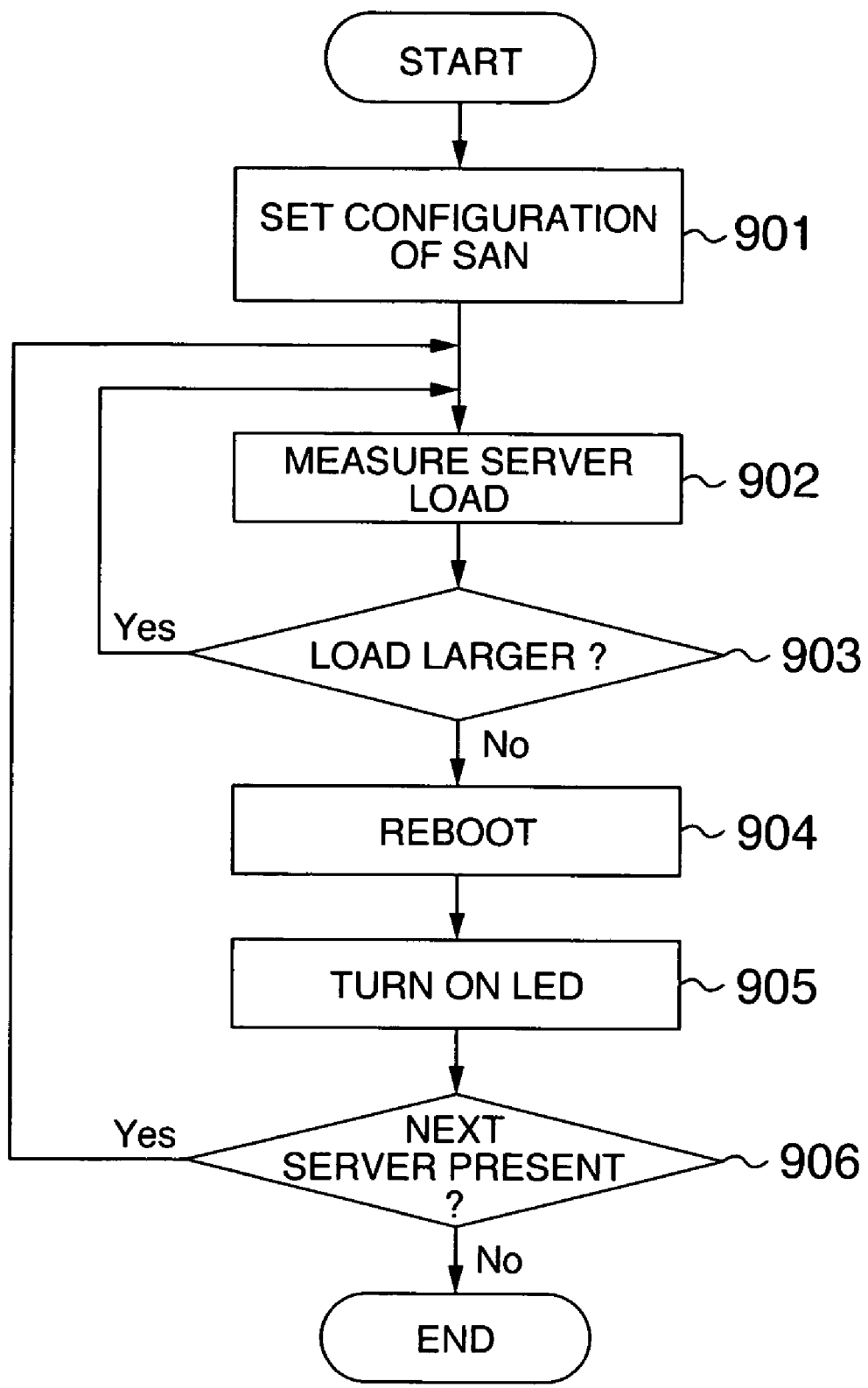

SCALE-UP IS POSSIBLE ABOUT SMP OF CPU BLADES

EXAMPLE OF EXPANSION OF TWO-CPU BLADE SMP TO FOUR-CPU BLADE SMP

RESTRICTION TO SMP OF CPU BLADES

UNITIZATION COEFFICIENT = MAXIMUM NUMBER OF BLADES FOR SMP

UNITIZATION COEFFICIENT = 4

108 SMP DEFINITION TABLE

1081

| COMBINATION # | UNIT | | | |
|---|---|---|---|---|
| | CPU SLOT #1 | CPU SLOT #2 | CPU SLOT #3 | CPU SLOT #4 |
| 1 | 8-WAY SMP | | | |
| 2 | 6-WAY SMP | | | FREE |
| 3 | 4-WAY SMP | | 4-WAY SMP | |
| 4 | 4-WAY SMP | | FREE | |
| 5 | 2-WAY | FREE | FREE | FREE |
| 6 | 2-WAY | 2-WAY | FREE | FREE |
| 7 | 2-WAY | 2-WAY | 2-WAY | FREE |
| 8 | 2-WAY | 2-WAY | 2-WAY | 2-WAY |

RUNNING SERVICE MANAGEMENT TABLE (110)

| SERVICE ID (1101) | SERVICE NAME (1102) | SERVICE CHARACTERISTIC (1103) | EXPANSION TYPE (1104) |
|---|---|---|---|
| 1 | SERVICE A | REBOOTABLE | SCALE-OUT |
| 2 | SERVICE B | NOT REBOOTABLE | SCALE-UP |
| 3 | SERVICE C | REBOOTABLE | SCALE-UP |
| 4 | SERVICE D | REBOOTABLE | SCALE-OUT |

FIG. 27

ALLOCATION REQUEST INFORMATION (271)

| SERVICE NAME (272) | SERVICE CHARACTERISTIC (273) | EXPANSION TYPE (274) | PERFORMANCE REQUIREMENT (275) |
|---|---|---|---|
| DB APPLICATION A | NOT REBOOTABLE | SCALE-UP | 6-WAY |
| DB APPLICATION B | NOT REBOOTABLE | SCALE-UP | 8-WAY |
| Web APPLICATION C | REBOOTABLE | SCALE-OUT | 2-WAY |
| Web APPLICATION D | REBOOTABLE | SCALE-UP | 4-WAY |

| BLADE ALLOCATION AUTOMATIC EXECUTION FLAG (276) | ON/OFF |
|---|---|

FIG. 31

| SERVICE ID | SERVICE NAME | SERVICE CHARACTERISTIC | EXPANSION TYPE | PERFORMANCE REQUIREMENT |
|---|---|---|---|---|
| \multicolumn{5}{c}{ALLOCATION REQUEST INFORMATION AFTER PRIORITY IS ESTABLISHED} |
| 1 | DB APPLICATION B | NOT REBOOTABLE | SCALE-UP | 8-WAY |
| 2 | DB APPLICATION A | NOT REBOOTABLE | SCALE-UP | 6-WAY |
| 3 | Web APPLICATION D | REBOOTABLE | SCALE-UP | 4-WAY |
| 4 | Web APPLICATION C | REBOOTABLE | SCALE-OUT | 2-WAY |

FIG. 37

SERVICE ID = 1, 2 : 4-WAY SMP
SERVICE ID = 3, : 2-WAY SMP

UNIT 1

| BLADE NUMBER | SERVICE ID |
|---|---|
| 1 | 1 |
| 2 | 1 |
| 3 | 1 |
| 4 | 1 |

UNIT 2

| BLADE NUMBER | SERVICE ID |
|---|---|
| 1 | 2 |
| 2 | 2 |
| 3 | 2 |
| 4 | 2 |

UNIT 3

| BLADE NUMBER | SERVICE ID |
|---|---|
| 1 | FREE |
| 2 | FREE |
| 3 | FREE |
| 4 | FREE |

UNIT 4

| BLADE NUMBER | SERVICE ID |
|---|---|
| 1 | 3 |
| 2 | 3 |
| 3 | FREE |
| 4 | FREE |

BLADE ALLOCATION MANAGEMENT TABLE

BEFORE TRANSPOSING IN REFERENCE ORDER

UNIT 1 → UNIT 2 → UNIT 3 → UNIT 4

AFTER TRANSPOSING IN REFERENCE ORDER

UNIT 3 → UNIT 4 → UNIT 1 → UNIT 2

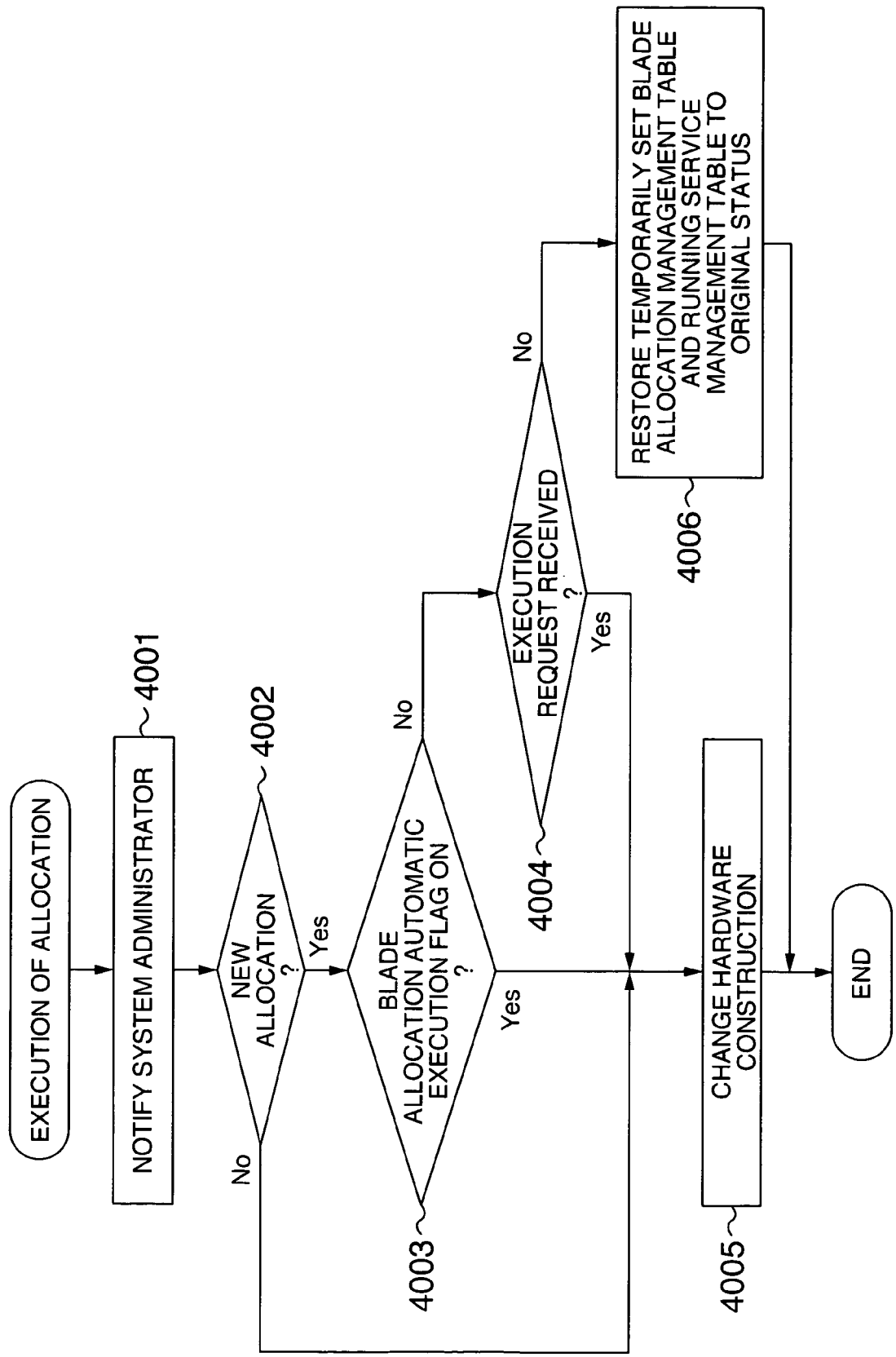

ARRANGEMENTS TO IMPLEMENT A SCALE-UP SERVICE

INCORPORATION BY REFERENCE

The present application is a continuation-in-part (CIP) application of U.S. application Ser. No. 11/060,424, filed Feb. 18, 2005 now abandoned, which claimed priority from Japanese application JP 2004-136095, filed Apr. 30, 2004. The present CIP application claims priority from the above two applications, and claims further priority from Japanese application JP 2005-133681, filed Apr. 28, 2005. The contents of all of the above applications is hereby incorporated by reference in its entirety into this application.

BACKGROUND OF THE INVENTION

The present invention relates to the computer system technology for allocating functions to a plurality of computers.

A server system called a blade system is known as a prior art of the server system that is formed of a plurality of servers enclosed within a single chassis. The blade system has a plurality of servers (hereinafter, referred to as blade or blade server) enclosed within a single chassis. Each server is built on one or a plurality of boards (CPU blades). The plurality of blade servers enclosed within one chassis includes servers having a plurality of different functions.

As to the maintenance or the like for the blade system constructed as above, it is popularly practiced that a schedule of operations is previously settled and that the information defined in the schedule is used to deploy and boot the images of the functions of the servers that constitute the blade system, thereby performing the functions on the servers. This maintenance is manually performed. The detailed technical content about the deployment is described in the patent specification of US Patent No. 2005/0010918.

So far, the prior art is not known that automatically changes the architecture, or deployment of the blade servers in the blade system of this kind.

The conventional blade system has a plurality of blade servers of different functions mounted to mix, but generally the functions of these blade servers cannot be recognized at a glance from the appearance. Therefore, during the maintenance, the operator might check out wrong blade servers by mistake. In addition, the conventional blade system (computer system) has another problem that, when any one of the onboard blade servers stops its operation due to a failure, the loads on the servers of each function are unbalanced, and thus the load on a blade server might be too large to offer enough service so that the blade system might lose the business opportunity.

The architecture of a plurality of CPU blades (computers, blades) to which one service is to be allocated in a blade server includes cluster type and SMP (Symmetric MultiProcessor) type. In the cluster type, since the CPU blades are loosely coupled, a service may be allocated over a plurality of blade servers (computer units) if the servers are connected to a network. The expansion of service can be made even within a blade server or even between the blade servers. This expansion of computer system is called "scale out". On the contrary, in the SMP type, since the CPU blades are closely coupled, the CPU blades are coupled through fast buses and thus the distances between the connected blades are desired to be short (to reduce the communicating time and realize fast communication). Therefore, a service is desired to allocate within the same blade server and to allocate to the adjacent slots. In other words, the SMP type has the restriction that the expansion should be made by allocating to a plurality of CPU blades arranged in sequence within the same blade server. Such blade server expansion is called "scale up". In the blade system having the scale-out and scale-up types mixed, there is a problem that the CPU blades to be secured for the scale-up implementation within the same blade server might be allocated to the scale-out to thus reduce the freedom of the scale-up implementation. The technical contents of the scale-up and scale-out schemes are described in the patent specifications of US Patent Application Publication Nos. 2005/0053057 and 2004/0267920.

SUMMARY OF THE INVENTION

An objective of the invention resides in the fact that the problems in the prior art are solved to make the functions of the blade servers mounted in a blade system be recognized at a glance from the appearance, to make it possible to change the deployment of the blade servers mounted in the blade system, and to make it possible to change the functions of the blade servers after detecting the change of loads on the servers due to a failure to thereby change the system architecture. In addition, another objective of the invention resides in achieving a suitable scale-up scheme.

According to the invention, the above objectives can be achieved by providing a server system that has a blade system formed of a plurality of servers of different functions mounted in one or a plurality of stages within a single chassis, and a management server for managing the blade system, wherein the management server has means for changing the functions of the plurality of servers.

In addition, the above objectives can be achieved by providing a server system that has a blade system formed of a plurality of servers of different functions mounted in one or a plurality of stages within a single chassis, and a management server for managing the blade system, wherein the management server has means for grouping the plurality of mounted servers so as to manage the servers, means for managing the deployment of the plurality of servers within the chassis, and means for changing the functions of the plurality of servers and transposing the functions to change the deployment of the servers within the chassis, and the deployment changing means makes the servers of each of the different functions be arrayed within the chassis.

Moreover, the above objectives can be achieved by providing a server system that has a blade system formed of a plurality of servers of different functions mounted in one or a plurality of stages within a single chassis, and a management server for managing the blade system, wherein the management server groups the plurality of mounted servers to manage for each function, manages the deployment of the plurality of servers within the chassis, and changes and superposes the functions of the plurality of servers so as to change the deployment of the servers within the chassis, and to thereby make the servers of each function be arrayed within the chassis.

Furthermore, the above objectives can be achieved by providing a computer system having a plurality of computer units each including a plurality of computers between which data communication is made at a faster speed than between the computer units, each of the computer units including at least first and second functions that are executed by the computers provided therein, and the computer system having a management server for managing the plurality of computers, wherein said management server has means for allocating a first function to a free computer, when there is the free computer within one computer unit, in order to increase the number of the computers to which the first function can be allocated within the same computer unit, and means for reallocating the second function to be allocatable to other computer units, which is already allocated to computers within one computer unit, to other computers of another computer unit when there is not any free computer within the same computer unit so that the number of computers for executing the first function cannot be increased, and for allocating said first function to said computers of which said second function has been moved by the reallocation so that said computers can be made free. Thus, the invention that achieves the above objectives includes a management server, a blade allocation method and a blade allocation program.

Other objects, features and advantages of the invention will become apparent from the following description of the embodiments of the invention taken in conjunction with the accompanying drawings.

BRIEF DESCRIPTION OF THE DRAWINGS

FIG. 3 is a diagram showing the structure of a server type management table of a management server.

FIG. 4 is a diagram showing the structure of a blade server management table of the management server.

FIG. 6 is a diagram showing an example of the structure of a new blade server management table after the change of deployment.

FIG. 9 is a diagram showing the deployment of servers after changing the positions of free servers.

FIG. 10 is a flowchart useful for explaining the processing operation for redeploying the blade servers to which the storage devices are connected by SAN.

FIG. 26 is a diagram showing details of running service management table.

FIG. 27 is a diagram showing details of allocation request information.

FIG. 31 is a diagram showing allocation request information produced after arranging the allocation request information in the order of priority.

FIG. 37 is a diagram useful for explaining the change of units in the order of reference.

FIG. 40 is a detailed flowchart for the execution of allocation.

DETAILED DESCRIPTION OF THE EMBODIMENTS

Embodiments of a server system and server-deploying method according to this invention will be described in detail with reference to the drawings.

<<First Embodiment>>

Figure 1:
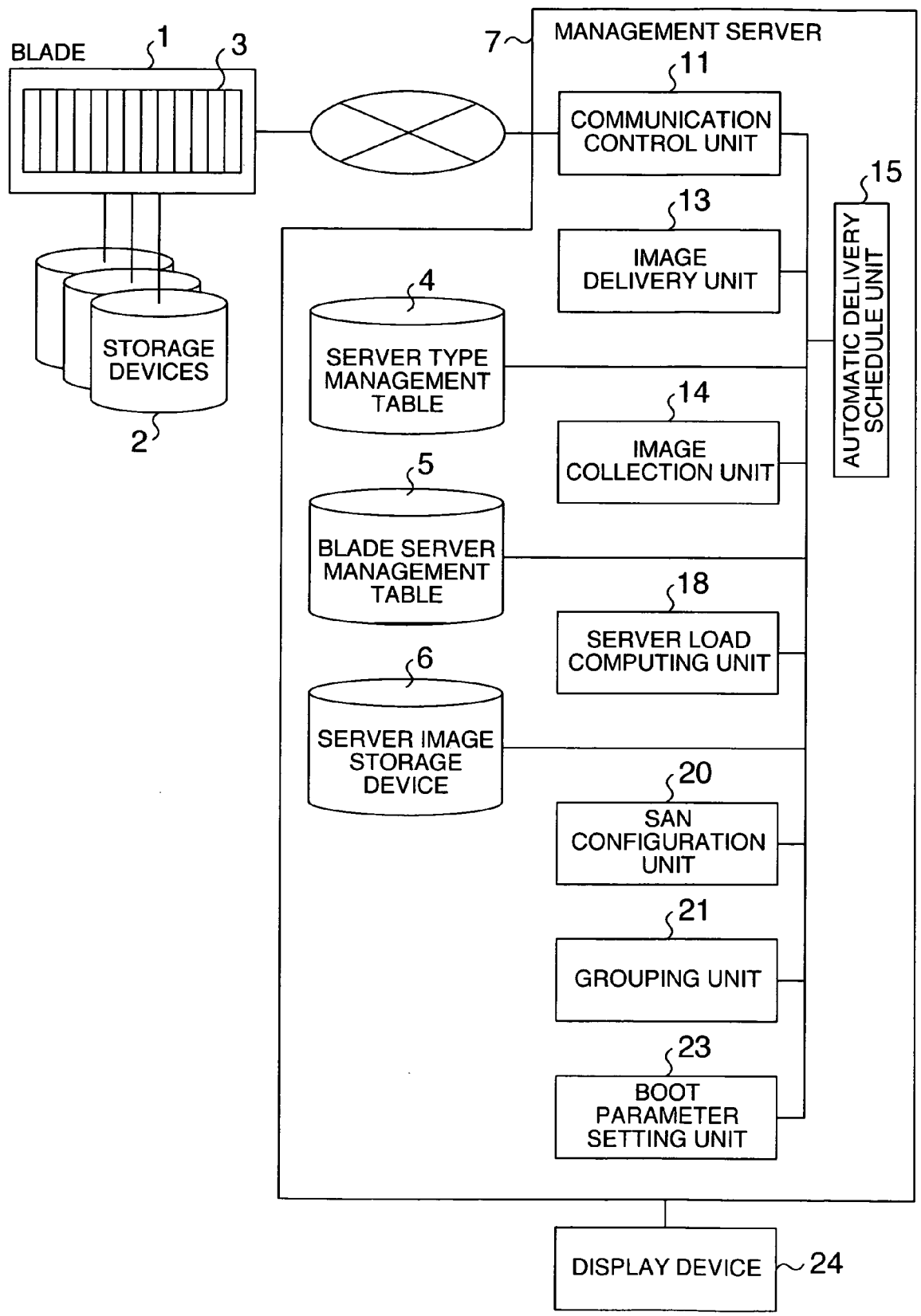
FIG. 1 is a block diagram of the construction of a server system according to a first embodiment of the invention.
Figure 2:
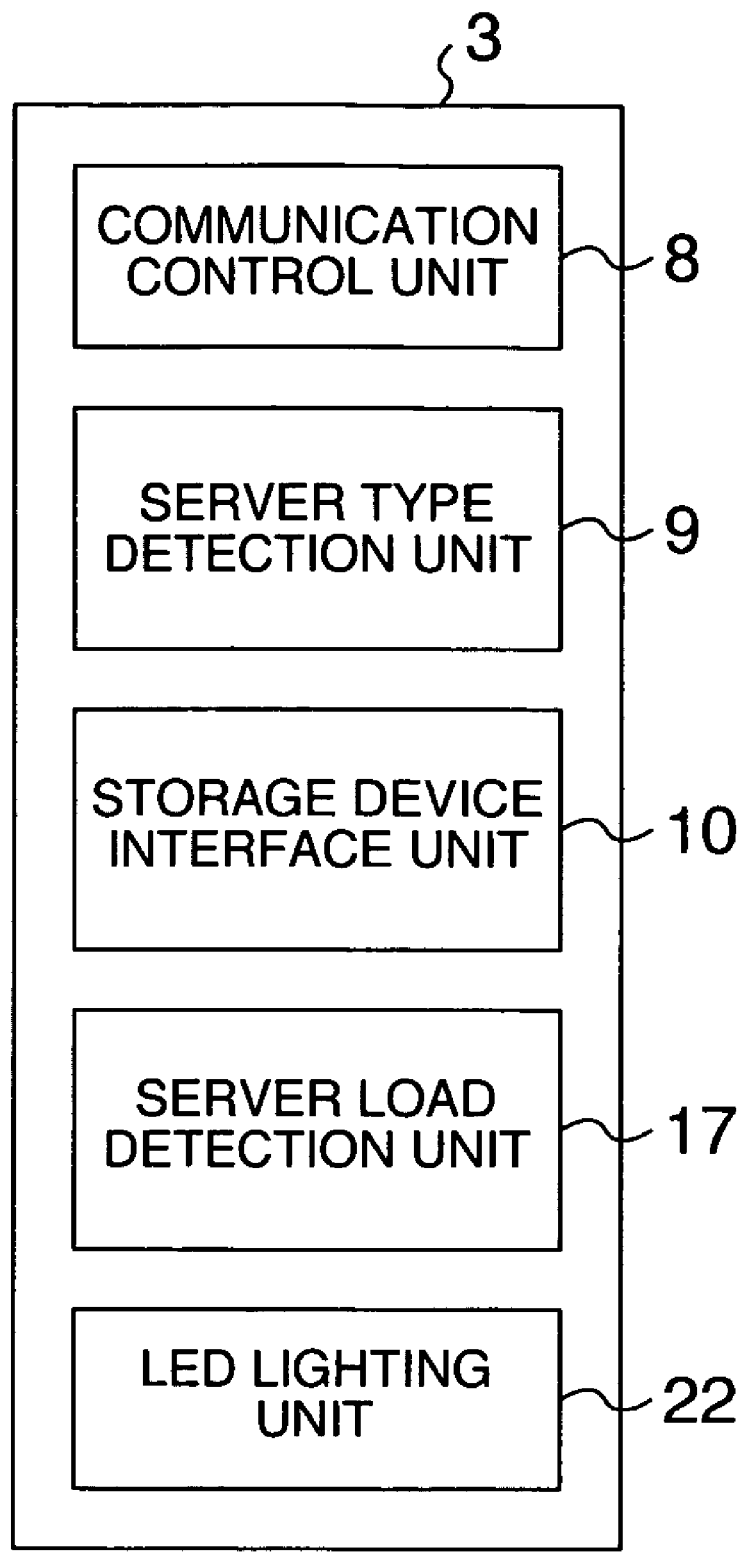
FIG. 2 is a block diagram showing an example of the construction of the blade server.

FIG. 1 is a block diagram showing an example of the construction of a server system according to the first embodiment of the invention. FIG. 2 is a block diagram showing an example of the construction of a blade server. Referring to FIGS. 1 and 2, there are shown a blade system 1 (hereinafter, abbreviated blade), storage devices 2, blade servers 3, a server type management table 4, a blade server management table 5, a server image storage device 6, a management server 7, communication control units 8, 11, a server type detection unit 9, a storage interface unit 10, an image delivery unit 13, an image collection unit 14, an automatic delivery schedule unit 15, a server load detection unit 17, a server load computation unit 18, an SAN configuration unit 20, a grouping unit 21, an LED lighting unit 22, a boot parameter setting unit 23, and a display device 24.

The server system of this embodiment, as shown in FIG. 1, has the blade 1 that is formed of a plurality of blade servers 3 (also called blades, CPU boards or computers) respectively inserted in a plurality of slots that are provided within a single chassis, the storage devices 2 that are respectively connected to the plurality of blade servers 3, and the management server 7 provided according to this embodiment. The respective blade servers 3 that constitute the blade 1 are independently operable computers which are each provided with the basic function as a server having a CPU, memory and external input/output and are connected to the corresponding storage devices 2. In addition, the blade server 3 may be built on a single board or over a plurality of boards. When the blade server 3 is constructed over a plurality of boards, the boards of blade server 3 are inserted in a plurality of slots of the chassis. When each processor is realized by a program, the program stored in the above memory is executed by the above CPU.

The plurality of blade servers 3 enclosed in the single chassis includes servers with a plurality of different functions. The blade 1 also has a load dispersion unit not shown, which controls the loads on the blade serves 3 classified by type of function, or on the same-type blade servers 3 to be uniformly dispersed. While a single blade is shown as the blade 1 having a plurality of blade servers 3 and enclosed within the single chassis as in FIG. 1, a plurality of the blades 1 may be provided on a plurality of shelves, or stages of the single chassis. When the blade system is formed in a plurality of stages, one blade 1 may be provided on each full stage or may be provided as a single blade over the plurality of stages. In addition, the plurality of blade servers included in one stage may be divided into a plurality of groups, and each group may be formed as blade 1. Moreover, the functions may be grouped and allocated to the blade servers close to each other, making it possible to shorten the communicating time and enhance the processing ability.

The management server 7 is connected through a network or the like to all the blade servers 3 of blade 1 so as to manage all the blade servers 3 of blade 1, but it may be formed within one of the blade servers 3. The management server 7 has the communication control unit 11 for controlling the communication with the blade servers 3, the image delivery unit 13 for delivering server images (also referred to as modules, program images, system images, disk images or volume images) to the blade servers 3, the image collection unit 14 for collecting the images from the blade servers 3, and the automatic delivery schedule unit 15 for making the process for changing the deployment of blade servers 3 within the blade 1 in accordance with this embodiment. The management server 7 further has the server load computation unit 18 for computing the load on each blade server 3, the SAN configuration unit 20 for setting the configuration of SAN through which the storage devices 2 are connected, the grouping unit 21 for grouping the blade servers 3, the boot parameter setting unit 23, the display device 24 for displaying the deployment status of a plurality of blade servers 3, the server type management table 4 for managing the types of function of the plurality of blade servers 3, the blade server management table 5 for managing the positions of the plurality of blade servers 3 deployed within the blade 1, and the server image storage device 6 for holding the server images that are to be delivered to the blade servers 3. Each blade server 3 performs processes on the basis of the server image allocated thereto.

The blade server 3, as illustrated in FIG. 2, has the communication control unit 8 for controlling the communication with the management server 7, the server type detection unit 9 for detecting the type of function of its own blade server, the storage interface unit 10 that is the interface to the storage device 2, the server load detection unit 11 for detecting the condition of the load on its own blade server, and the LED lighting unit 22 for controlling LEDs of colors corresponding to the type of function of its own blade server, and an LED indicative of the status of failure or the like to turn on, and though not shown, a plurality of the LEDs that are each excited in color corresponding to the type of function of the corresponding blade server and that includes the LED for indicating the status of failure or the like.

In this embodiment constructed as above, the storage device 2 has a mode of DAS (Device Attached Storage) or SAN (Storage Area Network), and it is connected to the blade server 3 through the storage device interface 10. If the storage unit 2 is connected in a mode of SAN, it is assumed that the configuration of SAN is set by a fiber channel switch through HBA (Host Bus Adapter).

The management server 7 manages the blade servers 3 by grouping the plurality of blade servers 3 enclosed within the single blade 1 or a plurality of blades 1 by using the grouping unit 21 and registering them in groups. In addition, the automatic delivery schedule unit 15 provided within the management server 7 changes the arrangement (deployment) of blade servers 3 and the types of function in accordance with this embodiment. The details of this process will be described later. The technical content about the deployment is written in detail in the patent document USP 2005/0010918.

The server type detection unit 9 provided within the blade server 3 responds to a request from the management server 7 to communicate with the management server 7 through the communication control unit 8 of its own blade server and through the communication control unit 11 of the management server and to detect a module (indicative of, for example, SMTP server or HTTP server) installed in its own blade server 3.

The image delivery unit 13 of management server 7 communicates through the communication control unit 11 and through the communication control unit 8 of the corresponding blade server 3 to deliver an image of the images stored in the server image storage device 6 to the corresponding blade server 3. The corresponding blade server 3, after the delivery of the image, restores the delivered image to the original state, reads in the information unique to the associated server that is set by the boot parameter setting unit 23, and boots the OS. In the embodiment of this invention, the term "image" indicates the backup image of the storage device 2 to which the corresponding server is connected. The image collection unit 14 of management server 7 collects the image of the associated blade server 3 through the communication control unit 11 and through the communication control unit 8 of the associated blade server 3, and causes the server image storage device 9 to store that image.

Each server has a built-in disk in which the delivered server image is stored. At the time of rebooting, each server can also make booting from the server image. In this case, the term "delivery" means that the corresponding server image is copied from the server image storage device 6 to the built-in disk of the corresponding blade. In addition, when the server image is delivered, it is stored in the server image storage device 6 in association with the blade server. In this case, the blade server may boot the server image by SAN boot. Here, the term "delivery" also means that the corresponding server image is copied from the server image storage device 6 and made associated with the corresponding blade.

The processes in the above-mentioned image delivery unit 13 and image collection unit 14 cannot be performed if the operation of the associated server is not stopped for a certain time. In other words, the image collection and image delivery are made under the condition in which the associated server is stopped in its operation. The server load detection unit 17 of blade server 3 measures the load on its own blade server 3. The term "load" used here is, for example, a usage rate of CPU, or the average value of the usage rates of CPU measured at intervals of constant time. In addition, the load may be the response time in which the request is processed or the average of that time. The measurement result obtained here is sent to the management server 7 through the communication control unit 8 and through the communication control unit 11 of management server 7.

The server load computation unit 18 of management server 7 has the function to average the measured results obtained from the server load detection units 17 of blade servers 3 of each type of function, and the function to predicatively compute the average of loads on the servers of the same function type if the number of the associated servers is increased or decreased. The method for the predictive computation may be, for example, the total value of the loads on the servers of each function type divided by the number of servers of that type assuming the increase or decrease of server number. The group generation unit 21 of management server 7 generates groups for the blade servers that are desired to manage as groups, and registers in those groups the blades 1 or blade servers 3 desired to manage as groups so that the blades 1 or blade servers can be managed as groups.

The SAN configuration generation unit 20 of management server 7 has the function to generate the configuration of the fiber channel switch when the storage devices 2 are connected to blade 1 by SAN, and to set the generated configuration in the fiber channel switch. The LED lighting unit 22 of blade server 3, when the blade server is booted, judges what type of function its own blade server belongs to, and excites the LED corresponding to the function type by referring to the table of FIG. 3 which will be described later. The boot parameter setting unit 23 of management server 7 has the function to set the information unique to each blade server although it refers to the information unique to the server to which the image is delivered during the process of image delivery unit 13. Each processor can be realized by program, object, process, thread or hardware.

FIG. 3 shows the structure of the server type management table 4 of management server 7. This will be described below.

The server type management table 4 shown in FIG. 3 is used to manage the function types of the plurality of blade severs 3. The server type management table 4 has columns of blade sever number 201, server type 202, LED 203 indicative of lighting color corresponding to LEDs, and detection modules 1~n (204, 205). The column of function type 202 represents the functions of servers such as Web server and mail server. The column of LED 203 indicates colors of LEDs excited according to the types of function. The columns of detection modules 204, 205 are used to judge what function type the module detected by the server type detection unit belongs to, such as SMTP server, POP server and HTTP server. The servers having the same type of function, for example, WEB servers could have different modules. Thus, those servers are registered discriminated as detected modules 1~n.

FIG. 4 shows the structure of the blade server management table 5 of management server 7. This will be described below.

The blade server management table 5 shown in FIG. 4 is used to manage the positions in the deployment, or array of the plurality of blade servers 3 within the blade. The blade server management table 5 has columns of blade server number 301 indicative of the position of place within the chassis, blade number 302, function type 303, status 304 indicating that the corresponding server is active (act) or not (no act), and executable function 305. The column of blade number 302 includes blade numbers for all blade servers registered as groups, and blade server numbers. The column of function type 303 indicates the types that the servers corresponding to the blade number have, and corresponds to the column 202 shown in FIG. 3. The column of executable function 305, when the storage device 2 is connected in a mode of DAS directly to the blade server, indicates the name of the module stored executable in the storage device 2. The blade server diagnosed as failure is not registered in this table.

The order in the column of number 301 is determined within each group and according to the order in which the blades are registered, and assumed to equal to the order of blade servers enclosed in the chassis that holds those blades. An example of the blade server management table 5, as illustrated in FIG. 4, shows a registered group of two blades each having four blade servers 3. In this case, two blades are formed within the single chassis. If the whole system is comprised of a plurality of chassis, all the blade servers enclosed in the chassis of each stage constitute one blade. Thus, the plurality of blades each of which is enclosed as above may be registered as a group. In the column of function type 303, when a certain type is determined, the functions and applications included in the blade server of that function type are uniquely determined by the group. For example, in the example shown in FIG. 4, all the blade servers of the type written as WEB server performs only the equivalent functions and applications.

Figure 5:
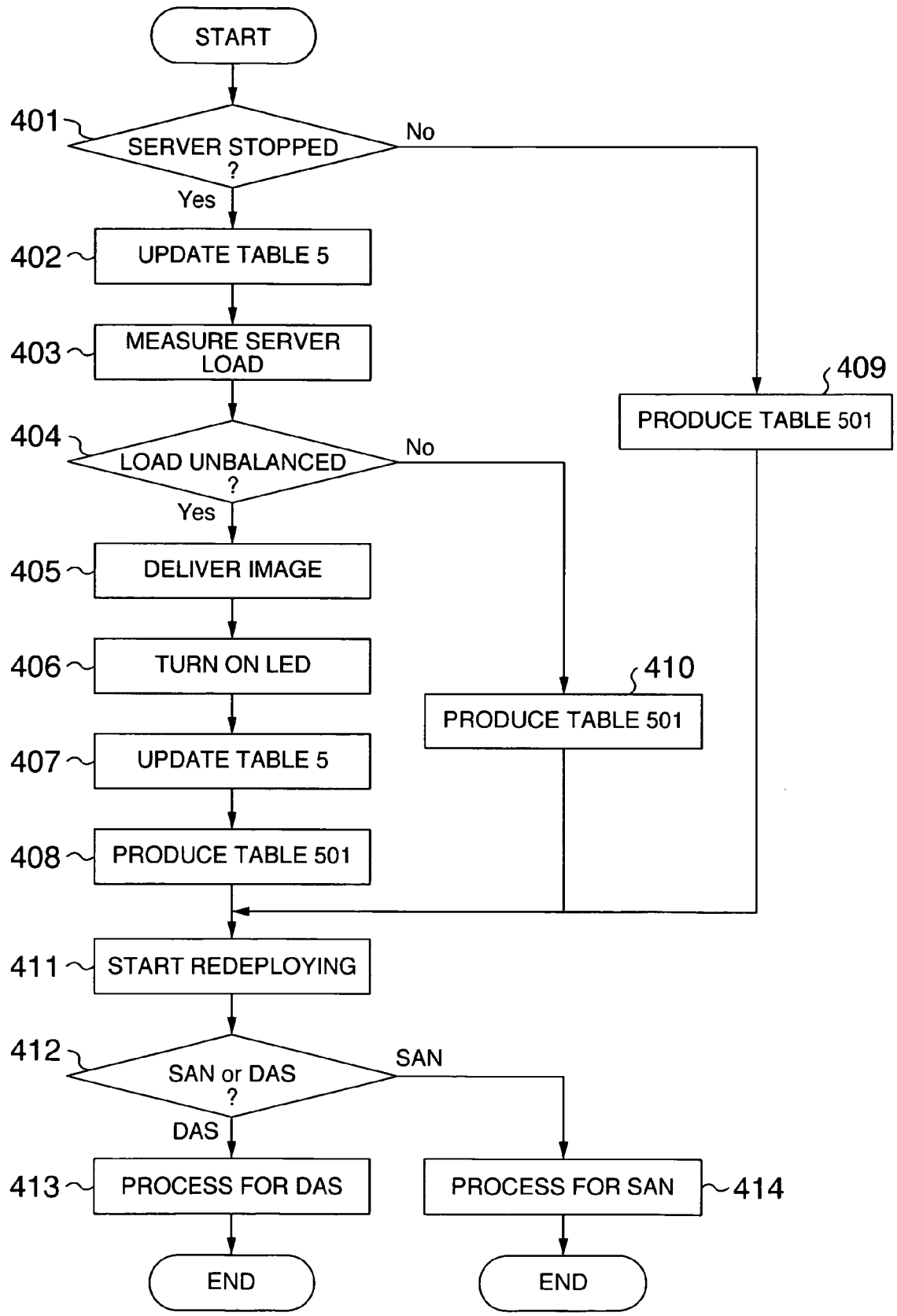
FIG. 5 is a flowchart useful for explaining the processing operation for changing the deployment of the blade servers in an automatic delivery schedule unit.

FIG. 5 is a flowchart of the operation for the deployment conversion of blade servers in the automatic delivery schedule unit 15. This will be described below. The example given below is the case in which the functions shown in FIG. 3 are limited to the WEB server and mail server. The process for the deployment conversion is started when any one of the blade servers is stopped due to a failure or started at regular intervals.

(1) When this process is started, judgment is first made of whether this process is started when one blade server is stopped. If this process is judged to have started due to the stop of one blade server, the stopped server is deleted from the table 5 shown in FIG. 4, thus the table 5 being updated (step 401, 402).

(2) When one blade server stops, the blade 1 causes the load dispersion device not shown to disperse the load acted on the stopped server so that the process, or load imposed on the stopped blade server can be dispersed to other same-type blade servers of the same function as the stopped server. Thus, the server load computation unit 18 of management server 7 collects the values of loads on the same-type blade servers from the server load detection unit 17, measures the average load on each server, and judges whether the loads on any ones of the same-type blade servers are too large, or whether the value of load is confined within an allowable range (step 403, 404).

(3) At the judgment step 404, if the load on any one of the blade servers of the same type as the stopped blade server becomes too large and out of the allowable range, or if the load on any one of, for example, other WEB servers than the stopped WEB server becomes too large due to the stop of the WEB server, judgment is made of whether there is any free server within the table 5. If there is any free one, the image of a WEB server (here, it is assumed that this WEB server is previously acquired and made in an initial state) is delivered to the free server from the image delivery unit 13. If there is not any free server, the number of mail servers present within the group is computed by referring to the table 5 shown in FIG. 4. If there is a plurality of mail servers, the server load computation unit 18 computes the predictive loads on the rest of subtracting one from the mail servers. If the increase of the number of WEB servers is found suitable from the computation result, the image delivery unit 13 delivers the image (that is previously collected) of the WEB server to one mail server. If there are not a plurality of mail servers or if the increase of the number of WEB servers is found unsuitable, nothing is made (step 405).

(4) If the necessary function is rebooted in the blade server after the process to deliver the image in step 405, the LED lighting unit 22 of that blade server causes the LED to be excited in the color determined by the function, thus updating the table 5. In addition, in the subsequent process, a new table obtained after this deployment conversion that will be again used to change the deployment of a blade server is generated on the basis of the information of the updated table 5 (steps 406~408).

(5) In step 401, if this process is started in other cases than when the blade server is stopped, this process is decided to have started at regular intervals in order to redeploy the blade servers, and thus a new table after the deployment conversion is generated on the basis of the current information of the blade server management table 5 (step 409).

(6) In step 404, if the load status is within the allowable range, a new table after the deployment conversion is generated on the basis of the information of the table 5 updated in the step 402 (step 410).

(7) Thus, a new table after the deployment conversion is generated in step 408, 409 or 410, and then the process for redeployment is started to redeploy the blade servers. When this process is started, judgment is first made of whether the storage device 2 connected to the blade server is connected in a mode of DAS or SAN (step 411, 412).

(8) In step 412, if it is connected in a mode of DAS, the process for DAS is performed which will be later described in detail. If it is connected in a mode of SAN, the process for SAN is performed which will be later described in detail. Then, the process for the redeployment of blade servers ends (step 413, 414).

FIG. 6 shows an example of the structure of the new blade server management table 501 generated after the deployment conversion. This example indicates the order of deployment of blade servers after the process of step 409 mentioned above made the deployment conversion when the current status of the blade server management table 5 was as shown in FIG. 4. Thus, the WEB servers, mail servers and free servers would be enclosed in this order in the chassis. Since a plurality of blade servers of each function type are deployed at a time as illustrated, the operator can easily grasp the positions of blade servers deployed and thus the maintainability can be improved. After the deployment conversion, the order of deployment of blade servers may be arbitrary. In addition, although the new blade server management table after the deployment conversion in step 408, 410 is not always the same as that generated in step 409, the later description will be made under the assumption that the new blade server management table after the deployment conversion is as shown in FIG. 6.

Figure 7:
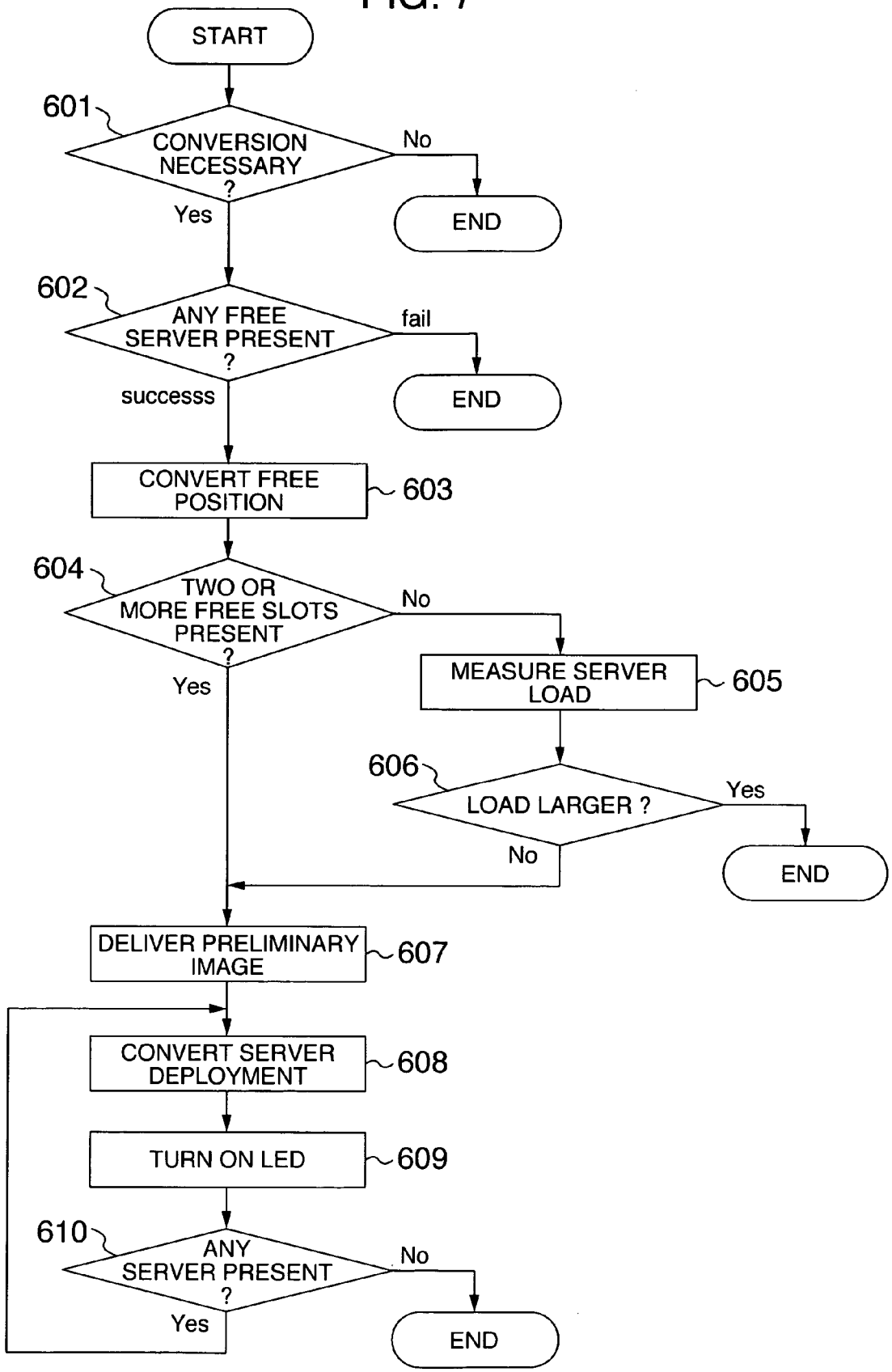
FIG. 7 is a flowchart useful for explaining the processing operation for the rearrangement, or redeployment of blade servers to which the storage devices are connected by DAS.
Figure 8:
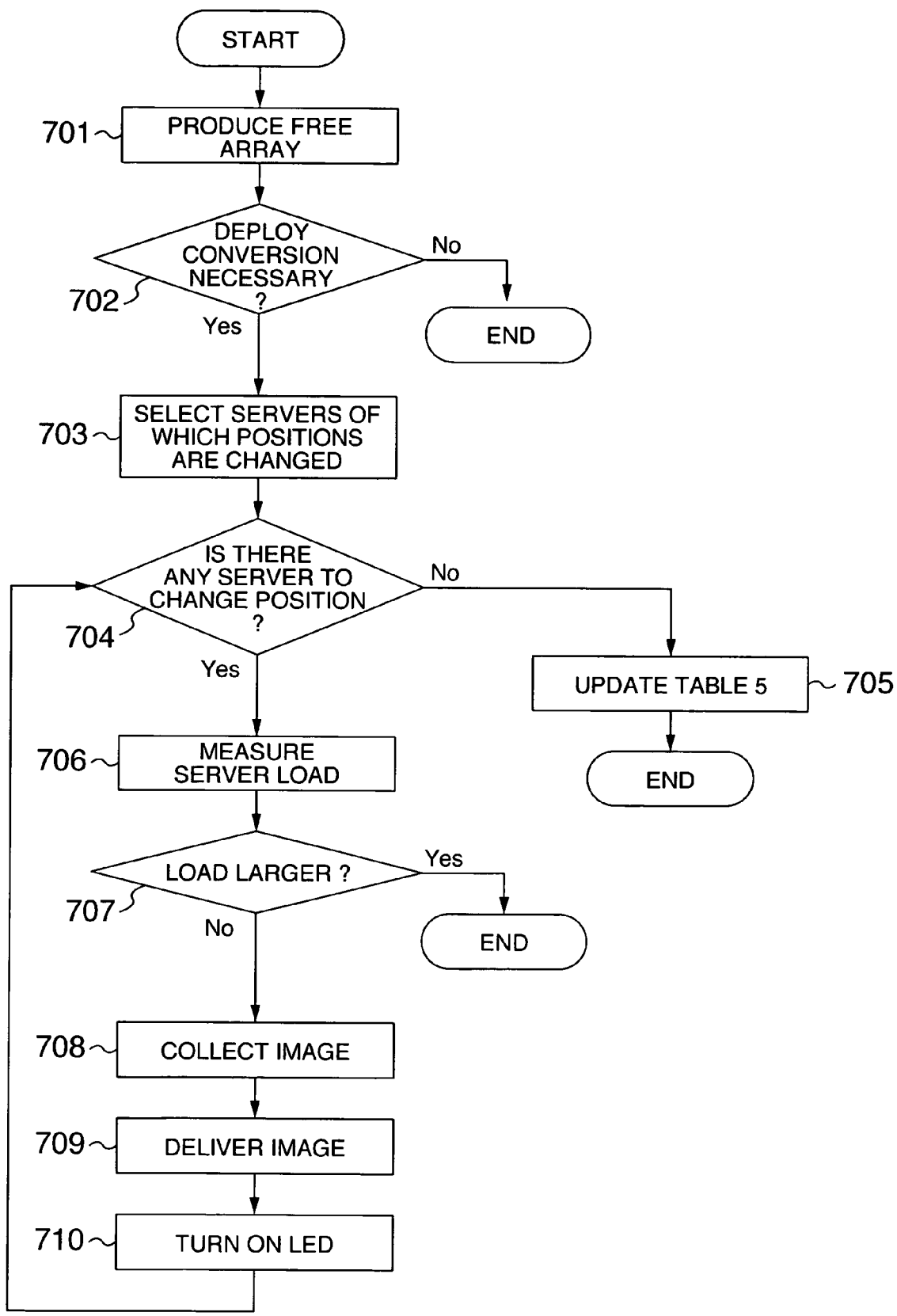
FIG. 8 is a flowchart useful for explaining the processing operation for changing the positions of free servers in step 603 of FIG. 7.

FIG. 7 is a flowchart of the operation for the redeployment of blade servers in the case when the storage device 2 is connected in a mode of DAS. FIG. 8 is a flowchart of the operation for the conversion of positions of free servers in step 603 shown in FIG. 7. FIG. 9 is a diagram showing the deployed state of servers after the free servers are converted in their positions. The operation for the redeployment of blade servers will be first described with reference to the flowchart of FIG. 7.

(1) First, the original table 5 shown in FIG. 4 is compared to the table 501 generated after the deployment conversion by the process of step 409. From this comparison, judgment is made of whether both are equal, or whether deployment conversion is necessary. If the two tables are equivalent, there is no need to convert, and thus the process ends (step 601).

(2) In step 601, if the two tables are different and thus if the deployment conversion of servers is necessary, judgment is made of whether a free server is registered in the table 5. If there is not any free server, the deployment conversion of servers is impossible, and thus the process ends (step 602).

(3) In step 602, if there are free servers, the positions of the free server are converted as will be described later with reference to FIG. 8. This process makes the free servers be located at the end of the table 801 as illustrated in FIG. 9. In this process, since the table shown in FIG. 4 has two free servers, the WEB server of No. 8 in this table is moved to the free server of No. 3 in this table, and similarly the mail server of No. 7 to the free server of No. 4. Then, the process for making the servers of Nos. 7 and 8 free is performed to produce the deployment shown in FIG. 9 (step 603).

(4) Then, judgment is made of whether there are two or more free servers. If there are not two or more free servers in the table, or if there is only one free server, degenerate running must be made if necessary. Therefore, the load status detected by the server load detection unit 17 of each blade server is collected, and the server load computation unit 18 of management server 7 predicts the load on each blade server at the time of degenerate running. The term "degenerate running" means that, if there is only one free server, the operation continues with either WEB server or mail server being stopped. Here, the server load computation unit 18 predicts the load considering both cases. In other words, the prediction of load is performed for the cases in which only one WEB server is stopped and only one mail server is stopped (step 605).

(5) Judgment is made of whether the computed, predictive value of load in step 605 exceeds a reference value of load even for each case of WEB server or mail server. If it exceeds the reference value, the deployment of blade server is not converted or this process ends at any rate but leaves a schedule to resume a certain time after this judgment. On the other hand, judgment of whether either server should be subtracted as a free server is made on the basis of the computed value of load. If the subtraction of one WEB server will have less influence of load, the mail server is moved to the free server. In this case, it is assumed that the delivered server image has the function of mail server previously collected (step 606).

(6) In step 604, if there are two or more free servers, a set of WEB server and mail server is delivered to any free servers. In this case, it is assumed that the images are previously collected. The servers produced by the delivery are preliminarily operated, but the inherent information such as log acquired during the operation of the servers is discarded (step 607).

(7) Then, the positional conversion of blade servers is performed. The term "positional conversion" means that the two associated servers A and B are determined and the images of A and B are collected at a time, and just when the collection of images of A and B has been finished, the images of A and B are simultaneously delivered to B and A, respectively. If server B is free, the image of server B need not be collected, but the field of table 5 corresponding to server A is set to be free and at the time of delivery, and server A is stopped. The servers A and B always make a set of WEB server and mail server. In this example, since the process in step 603 brings about the status shown in FIG. 9, the process here transposes the mail server of No. 2 and WEB server of No. 5, and thus the status shown in FIG. 6 is brought about. Subsequently, when a necessary image is rebooted in each server, the LED lighting unit 22 of each server causes the LED corresponding to the function to be turned on (step 608, 609).

(8) Thereafter, if there are other servers to be transposed, the processes from step 608 are repeated. If there are not any servers to be transposed, the process ends (step 610).

The process to bring a free server to the last position within the blade in the above step 603 will be described with reference to the flowchart of FIG. 8.

(1) First, the order of a free server on table is checked by referring to the table 5 shown in FIG. 4, and a table called free-server table A is generated with its number not shown. In this free-server table A is also stored the function type of the server of the corresponding number (step 701).

(2) The free-server table A produced in step 701 is compared to the after-deployment blade server table 501 shown in FIG. 6, and judgment is made of whether the deployment conversion is necessary from the fact that the free servers on the tables are located at the same positions or not. If the free server positions are the same, or if the deployment conversion is not necessary, the process ends (step 702).

(3) In step 702, if the free servers are located at different positions, or if the deployment conversion is necessary, the free servers necessary for the positional conversion and the server types are determined from the above free-server table. If a single server is necessary to convert in its position, the position of the corresponding server is automatically determined. If two or more servers are necessary to convert in their positions, the matching relation between the servers is, for example, determined as follows. The numbers of free servers in the function type column of table 501 and the current types, or the types in table 5 are stored in table B. Then, the above free server table A is scanned in numerical order to check if the same type as in table A is present in table B. If there is a server of the same type, that server is determined, and the number of the decided server in table B is deleted from the table B. If there is not any server of the same type, the free server table A is scanned for the next type without determining, and the same operation is repeated. When the scanning of table A is finished, the servers not determined yet as the corresponding servers in table A are appropriately determined by selecting from the servers remaining in table B. Thus, after the associated servers are determined as above, the amount that the server conversion process can handle in step 608 described with referent to FIG. 7 can be suppressed to the minimum (step 703).

(4) After the process in step 703, judgment is made of whether the positional conversion of servers is necessary. If the positional conversion is not necessary, the table 5 is updated, and the process ends (step 704, 705).

(5) In step 704, if the positional conversion is necessary, the loads on the servers at the time of degenerate running are computed as described above. Then, judgment is made of whether the load value at the degenerate running time is larger than a reference value. If the load value is larger than the reference value, the process ends or this process ends at any rate but leaves a schedule to resume a certain time after this judgment (step 706, 707).

(6) In step 707, if the load value is smaller than the reference value, the image of the corresponding server determined by the process of step 703 is collected and delivered so that the positional conversion can be performed. In this positional conversion process, the associated servers are temporarily stopped. If the image is rebooted in the server after the positional conversion, the LED lighting unit 22 within that server causes the LED of the color corresponding to the type to be excited (steps 708~710).

The result of the above processes is that the server array of the blade server management table listed in FIG. 4 is changed to that of the table 801 shown in FIG. 9, and at the same time the free servers are placed in the fields at the bottom end of the number column.

Thus, the redeployment of blade servers in the case of DAS in step 413 shown in FIG. 5 has been described with reference to the flowcharts of FIGS. 7 and 8. In the above-mentioned redeployment in the case of DAS, when at least two free blade servers exist within blade 1, the free servers are used to efficiently make the redeployment for the sake of swift processing. However, if a certain necessary time is allowed for the redeployment, the redeployment of blade servers can be performed as long as one free blade server exists within blade 1. The redeployment of servers in this case can be made by, for example, utilizing a method well known as data sort approach, that is, by moving the function of a server desired to move to the free server, making that server free, and repeating this conversion operation until a desired deployment can be accomplished. In addition, if one of the servers of a function type on which the load is light is stopped, and considered as a free server so that the above processes can be performed, the redeployment of servers can be carried out even if there is not any free blade server within blade 1.

In the above method for the case of DAS, the module for characterizing the function of each blade server must be delivered as the image of the function to the corresponding one of the storage devices 2 that respectively belong to the blade servers. Therefore, in either case, when the redeployment of servers is made, the associated server is stopped. Thus, in the flowchart of FIG. 5, the processes after the start of redeployment from step 408 should be performed under the condition in which the load on the whole server system is low. After a table is produced by redeploying the servers in steps 408~410 in FIG. 5, it is desirable that the redeployment process be interrupted and that the following processes from step 408 be started in the time zone such as midnight in which the load on the whole server system becomes low.

FIG. 10 is a flowchart useful for explaining the redeployment of blade servers in the case when the storage devices 2 are connected in a mode of SAN. This deployment process will be described below. When the storage devices 2 are connected in a mode of SAN, it is assumed that the storage devices 2 are respectively connected to the blade servers 3 through a fiber channel switch by using a fiber cable.

(1) First, the SAN configuration unit 20 of management server 7 produces a configuration of the fiber channel switch so as to bring about the post-redeployment status of table 501 generated by any one of the steps 408 through 410 of the flowchart of FIG. 5, and sets this produced information in the fiber channel switch through the communication control units 8 and 11 (step 901).

(2) Then, the number of each server to need to reboot is stored in a table C not shown, and the processes from step 902 to step 906 are repeatedly performed for the servers stored in the table C. Thus, in order for the set information to be reflected on each server, the server load computation unit 18 computes the predictive load as previously described considering that the associated server is stopped by reboot. Then, judgment is made of whether the load is larger than a specified value (step 902, 903).

(3) In step 903, if the load is larger than the specified value, the same process is executed for the next server in table C. If the load is not larger than the specified value, the server is rebooted by the OS. When the reboot is completed, the LED lighting unit 22 causes the LED of the color corresponding the rebooted function to be turned on (steps 904 and 905).

(4) Thereafter, the reboot-completed server is deleted from table C. If a server still exists in table C, the redeployment process goes back to step 902, and this step and the following processes are repeated. If there is not any server in table C, the redeployment process ends (step 906).

When a blade server constituting the blade is stopped due to a failure or the like or when the deployment of blade servers is disturbed for other reasons, the functions of blade servers are transposed to form a new deployment as described above. The management server provided in this embodiment, however, always monitors the status of the load on each blade server. If the load becomes larger than a reference value, the module of the same function is delivered to the free server to increase the number of the servers of that function. On the contrary, if the load becomes smaller than the reference value, one of the servers having the same function is made free, thus decreasing the number of servers having that function. Thus, the efficiency at which the whole server system performs those processes can be improved. Even in this case, the disturbed deployment of blade servers can be modified to be correct.

Figure 11:
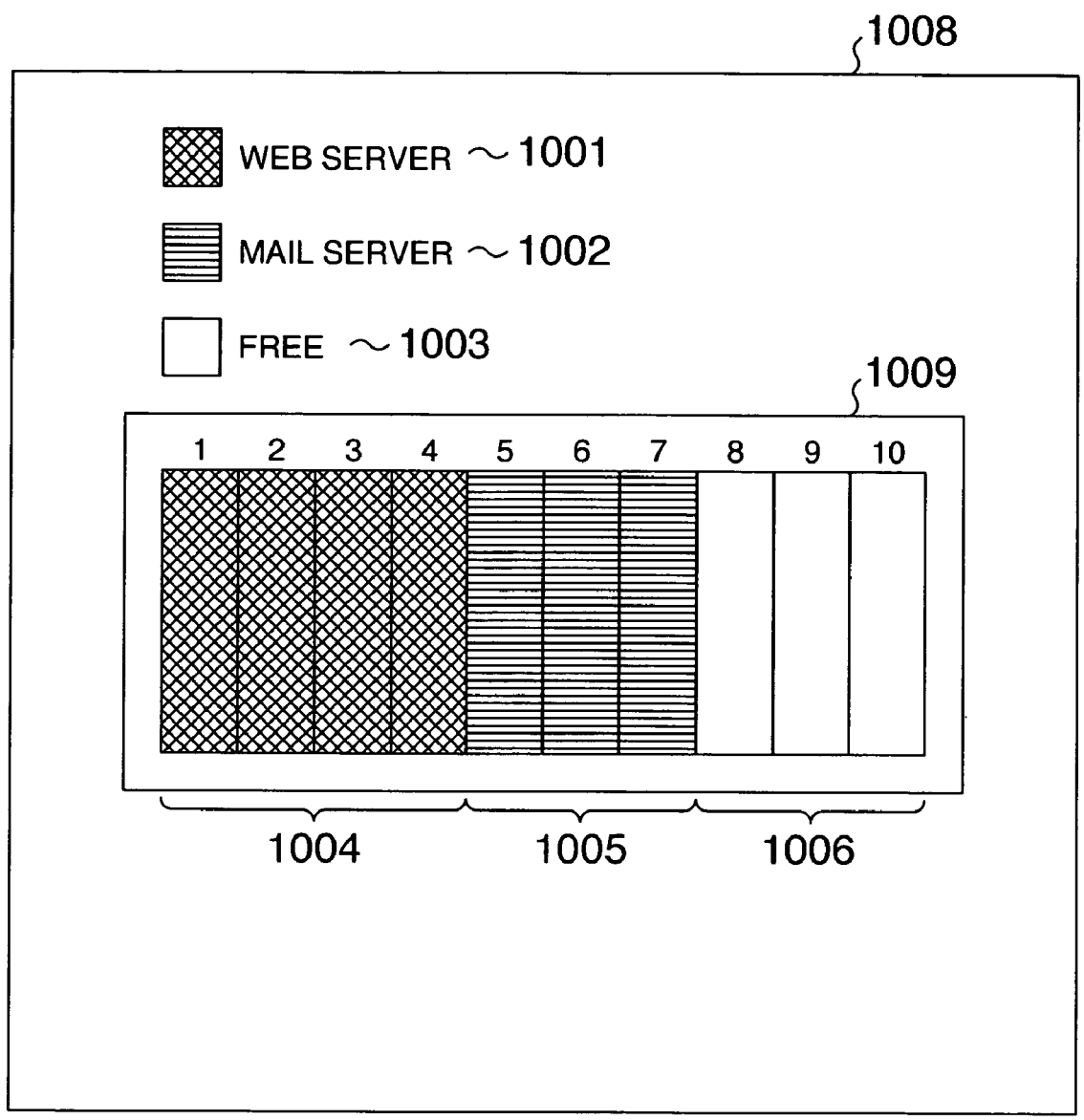
FIG. 11 is a diagram showing an example of the monitor screen of a display device that displays the deployment of a plurality of blade servers.

FIG. 11 is a diagram showing the monitor screen of the display device 24 on which the deployment of a plurality of blade servers 3 are displayed. In FIG. 11, on a display screen 1008 are displayed server types and colors 1001, 1002 of LED to be turned on in association with the server types. For example, it is assumed that 1001 represents WEB server as the function type and green color as the color of LED excited in association with the type, and that 1002 denotes mail server as the function type and red color of LED excited in association with the type. In addition, a free server 1003 is shown to be free as the function type and to have LED not excited. Moreover, 1009 represents blade 1 that includes WEB servers 1004, mail servers 1005 and free servers 1006. Thus, the blade servers 3 displayed on the screen 1008 are respectively indicated at their physical positions. The blade servers of WEB servers 1004, mail servers 1005 and free servers 1006 are respectively displayed on colors as described above.

Figure 12:
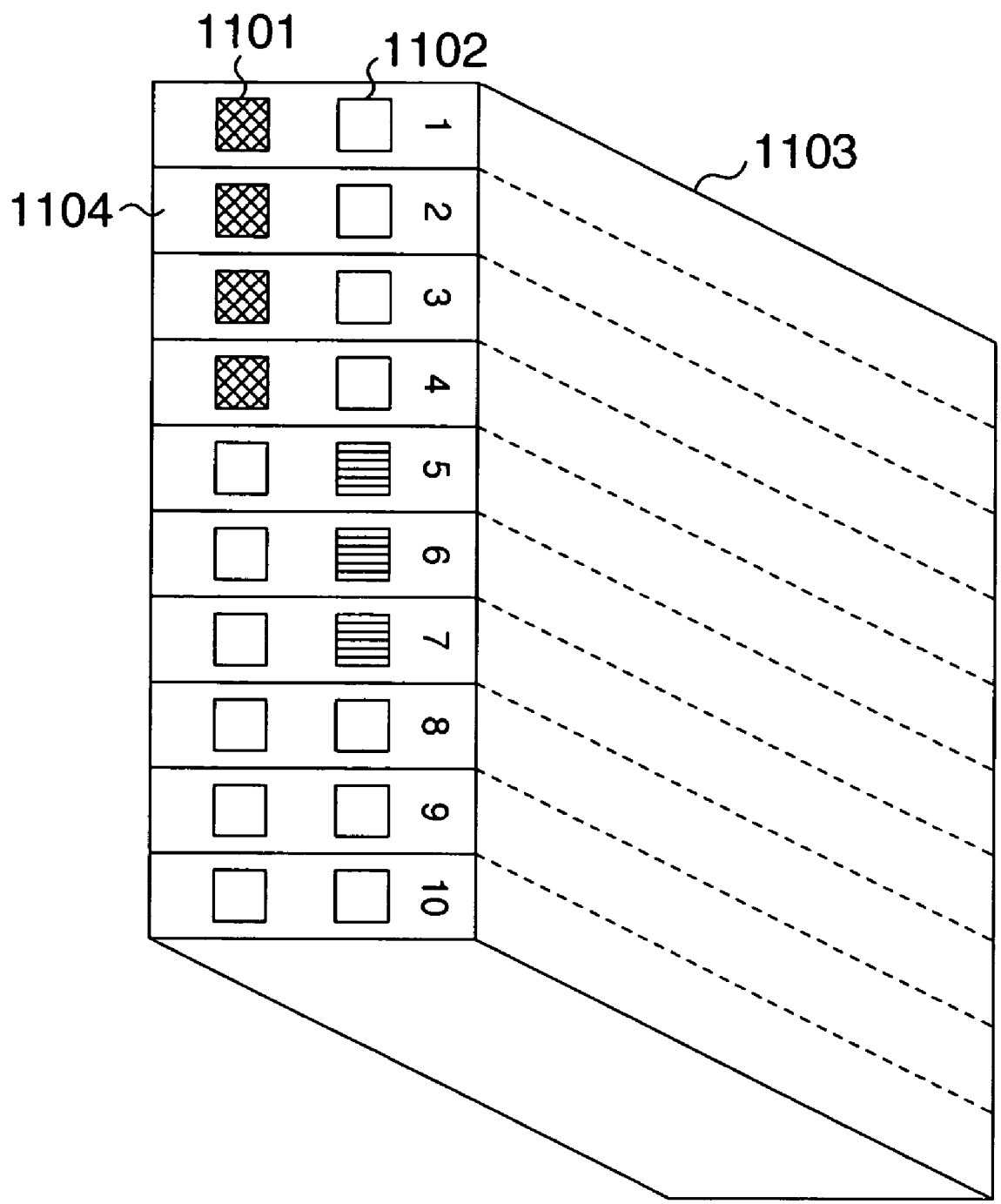
FIG. 12 is a diagram showing the situation in which LEDs are turned on in an actual apparatus corresponding to the example of displayed screen shown in FIG. 11.

FIG. 12 is a diagram showing the situation in which the LEDs are turned on in the actual apparatus corresponding to the example of the display screen shown in FIG. 11. In FIG. 12, 1101 represents green LEDs, 1102 red LEDs, 1103 the blade 1, and 1104 the blade servers 3.

By viewing the monitor screen shown in FIG. 11, the operator can recognize at a glance how the blade servers 3 are deployed in blade 1. In addition, even in the actual apparatus, since the LEDs of the different colors are respectively turned on corresponding to the functions of blade servers as shown in FIG. 12, the operator can understand the function of each blade server at one view.

Figure 13:
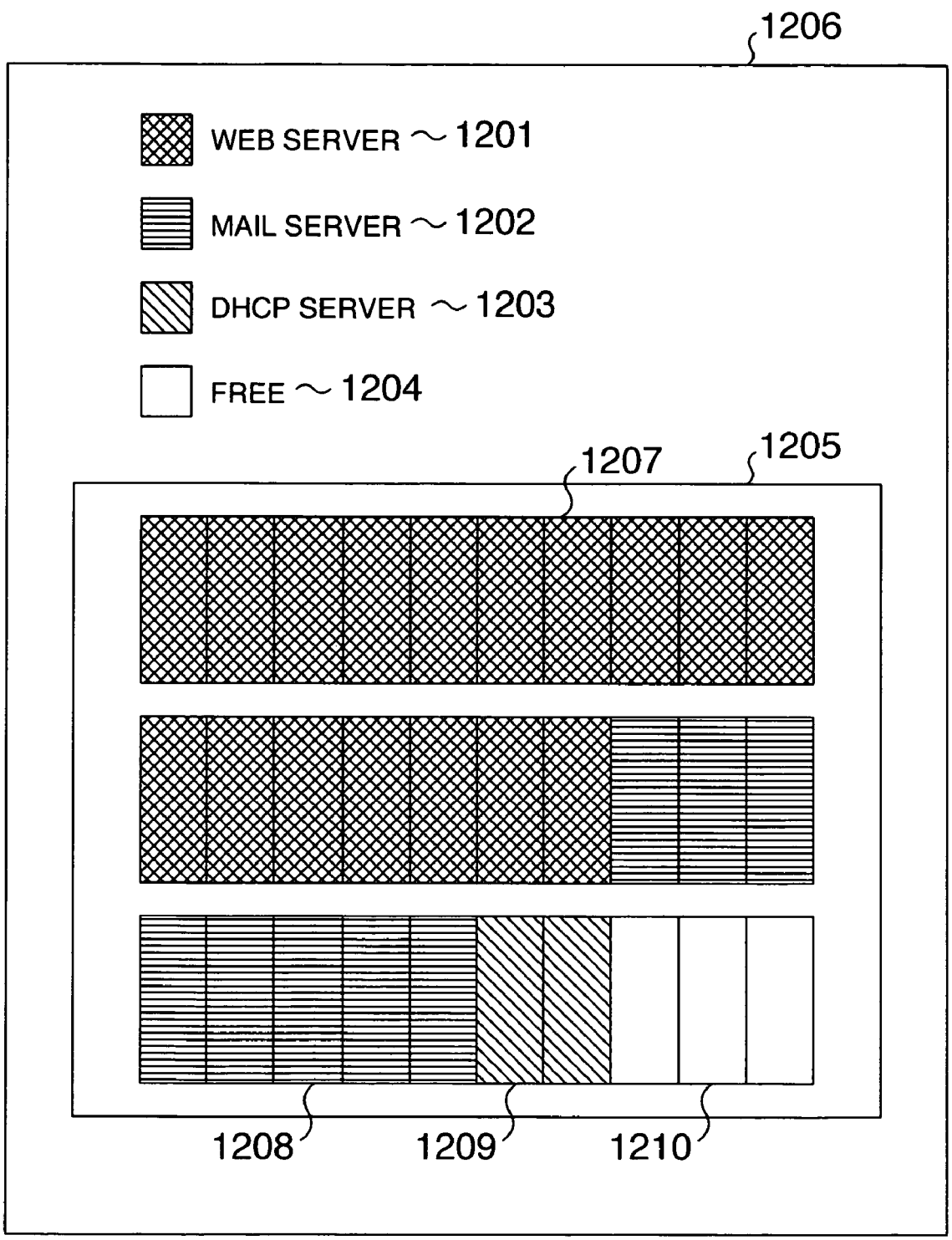
FIG. 13 is a diagram showing an example of the monitor screen of a display device 24 that displays the deployment of a plurality of blade servers 3 having groups of a plurality of blades mounted on a plurality of stages of a blade system.

FIG. 13 is a diagram showing an example of the monitor screen of the display device 24 on which a plurality of blade servers 3 of each blade are displayed in the corresponding field of stage. That is, the blade system is formed of a plurality of stages so that a plurality of blades as a group is respectively provided in the stages.

On a display screen 1206 shown in FIG. 13 are shown function types of servers and colors of LEDs 1201, 1202 and 1203 that are excited in association with the server type. For example, 1201 represents WEB server as the function type of server and green color of LED, 1202 mail server as the function type of server and red color of LED, 1203 DHCP server as the function type of server and blue color of LED. In addition, 1204 denotes free server and LED not excited, 1205 a chassis that encloses blade 1, 1207 WEB servers, 1208 mail servers, 1209 DHCP servers, and 1210 free servers. The blade servers displayed on the display screen 1205 are indicated at their physical positions. The WEB servers 1207, mail servers 1208, DHCP servers 1209 and free servers 1210 as blade servers are respectively displayed in colors mentioned above.

Figure 14:
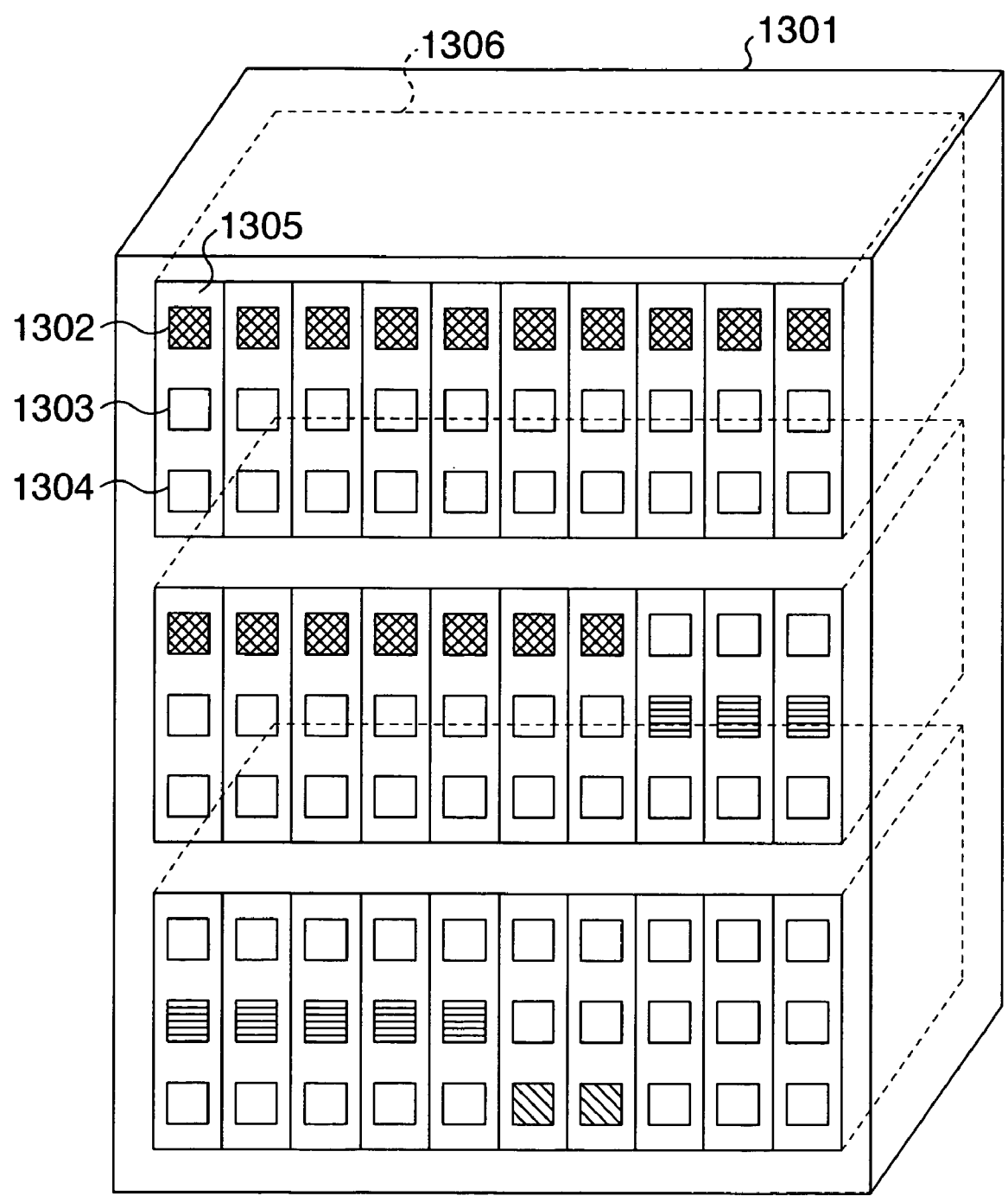
FIG. 14 is a diagram showing the situation in which LEDs are turned on in an actual apparatus corresponding to the example of the monitor screen shown in FIG. 13.

FIG. 14 is a diagram showing the situation in which the LEDs are turned on in the actual apparatus corresponding to the example of the display screen shown in FIG. 13. In FIG. 14, 1302 represents green LEDs, 1303 red LEDs, 1304 blue LEDs, 1306 the blade 1, and 1305 the blade servers 3. In addition, 1301 is a chassis that encloses a plurality of blades 1.

By displaying on the monitor screen as shown in FIG. 13, the operator can recognize at a glance how a plurality of blades 1 are deployed and how the blade servers 3 are deployed in each blade. Moreover, even in the actual apparatus, since the LEDs of the colors are respectively turned on corresponding to the function types of the blade servers as shown in FIG. 14, the operator can understand at one view the function of each blade server.

While the WEB server, mail server and DHCP server are respectively associated with green, red and blue in the example of the monitor screen and in the example of the LED excitation on the actual apparatus as described above, the correspondence between the server's function types and colors may be arbitrarily set. In addition, the indication of colors on the actual apparatus may be made by other lighting or displaying devices than LEDs as long as those devices can indicate colors. Moreover, while the corresponding color indicators are allocated to the function types of the blade servers, and displayed or excited as described with reference to FIGS. 11~14, a color indicator different from the color corresponding to the function type may be used and excited so that a blade server stopped by a failure or the like can be recognized with ease or other means for causing an indicator to blink may be provided for that purpose.

The above-mentioned processes in this embodiment can be formed as a processing program. This processing program can be offered by storing it in recording media such as HD, DAT, FD, MO, DVD-ROM and CD-ROM.

Figure 15:
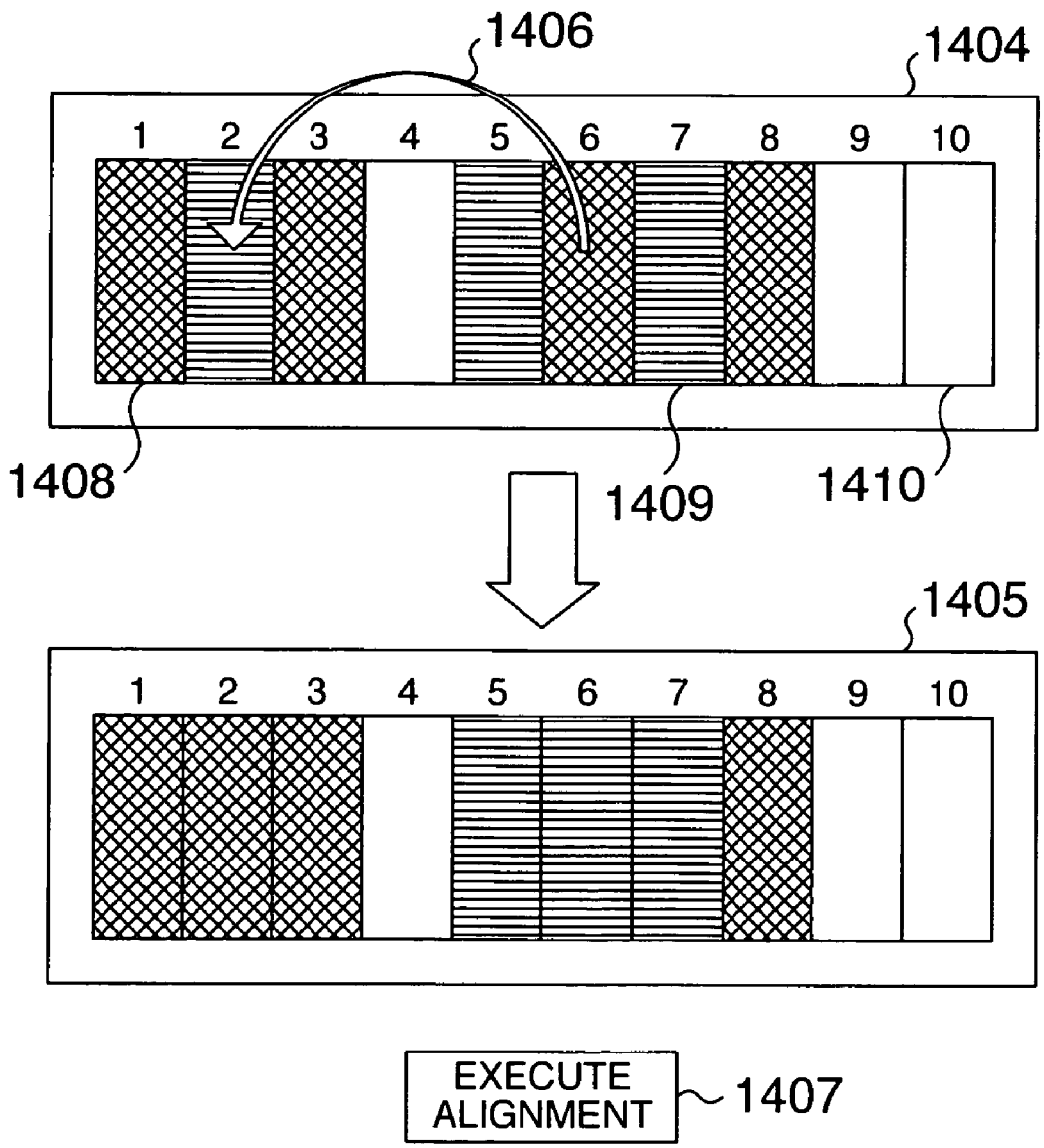
FIG. 15 is a diagram useful for explaining the manual operation for changing the deployment of blade servers within a blade by referring to the monitor screen on which the blade servers are displayed.

FIG. 15 is a diagram to which reference is made in explaining the deployment conversion operation for manually changing the deployment of blade servers within blade 1.

In FIG. 15, in the same way as described previously, 1401 and 1402 represent server types and colors of LEDs that are respectively turned on in association with the server types. For example, at 1401 are shown WEB server as server type and green as the color of activated LED, at 1402 mail server as server type and red as the color of activated LED, and at 1403 free server and LED not energized.

It is now assumed that an array of servers of a blade is displayed at 1404 on the monitor screen. In this array, WEB servers 1408, mail servers 1409 and free servers 1410 are disorderly disposed. This arrangement will be tried to change manually by on-screen operation. In this case, for example, the WEB server of No. 6 is moved to the position of the mail server of No. 2 by manual operation of drag and drop using a mouse as indicated by reference numeral 1406. Thus, on the display screen, the server function of the drag source and the server function of the drag destination are transposed to each other so that the deployment on the display screen is changed as indicated at 1405. After the deployment is changed by this manual operation, a button of "EXECUTE ALIGNMENT" indicated at 1407 on the display screen is clicked by the mouse, thereby ordering the management server 7 to start the process for the redeployment of the blade servers.

Figure 16:
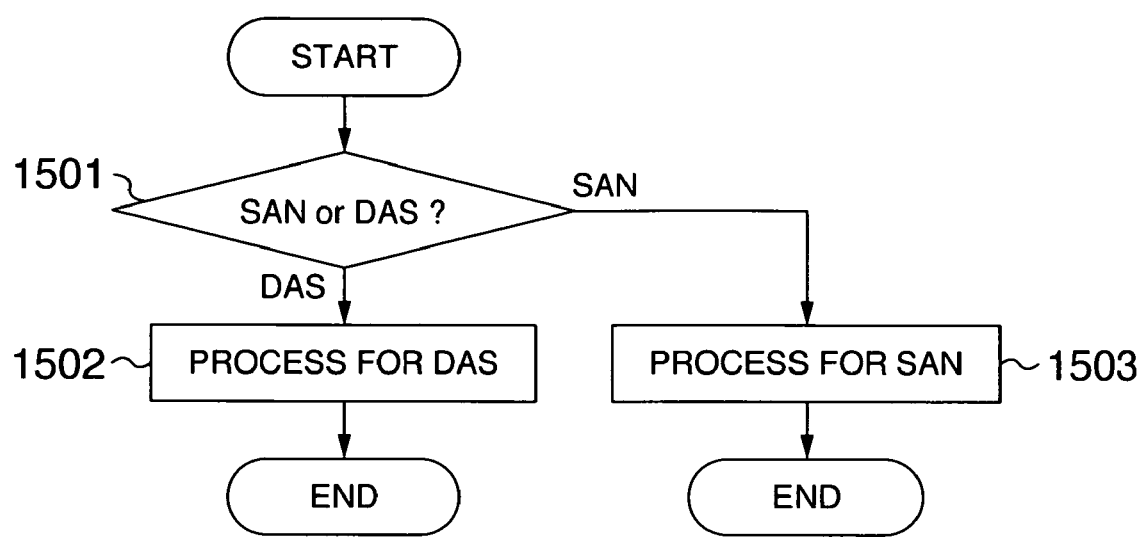
FIG. 16 is a flowchart useful for explaining the processing operation started to redeploy the blade servers when the "EXECUTE ALIGNMENT" button in FIG. 15 is clicked.

FIG. 16 is a flowchart to which reference is made in explaining the operation for processing the redeployment of blade servers that is started by clicking the button of "EXECUTE ALIGNMENT" on the screen mentioned with reference to FIG. 15. In this flowchart, the processes of steps 1501, 1502 and 1503 are the same as those of steps 412, 413 and 414 in the flowchart of FIG. 5, and thus will not be described here. It is assumed that the table produced after the deployment conversion mentioned with reference to FIG. 6 is established when the on-screen operation is made as in FIG. 15.

In general, when managing the blade system, the operator draws and inserts some of the onboard blade servers from and into the blade system for the purpose of maintenance, and pushes the reset buttons mounted on the servers. However, the present blade system scarcely have means for helping the operator visually recognize the target server, and thus might suffer a critical damage due to an erroneous operation.

According to the first embodiment, since the servers can be classified according to the function types, and the deployment of the servers can be automatically organized in order, it is possible to improve the maintainability. In addition, failure of onboard servers can be considered as a factor of the need for the maintenance operation. The failure of one server might cause unbalance of loads on the other onboard servers. However, according to the embodiment mentioned above, in order to avoid this unbalance, a facility to automatically transpose the functions of the servers can be provided to equilibrate the loads, and thus the processing ability of the blade system can be utilized to the limit until the maintenance is completely carried out.

<<Second Embodiment>>

The second embodiment of the invention will be described. The second embodiment makes it possible that even though the blade system has a mixture of the scale-up implementation necessary to expand the service (function) within the unit (blade server) and the scale-out implementation capable of expanding the service even across the units not within the unit, the services can be allocated to the CPU blade (computers) without interfering with the scale-up implementation. The scale-up scheme is the process to expand the service in the case when the relation between a plurality of CPU blades to which one service is allocated is closely coupled (the data communication between the CPU blades is fast). The scale-out scheme is the process to expand the service in the case when the relation between a plurality of CPU blades to which one service is allocated is loosely coupled (the data communication between the CPU blades is slow). The technical content of the scale-up and scale-out are described in detail in the patent documents, USP Nos. 2005/0053057 and 2004/0267920, respectively.

(Architecture and Outline of System)

Figure 17:
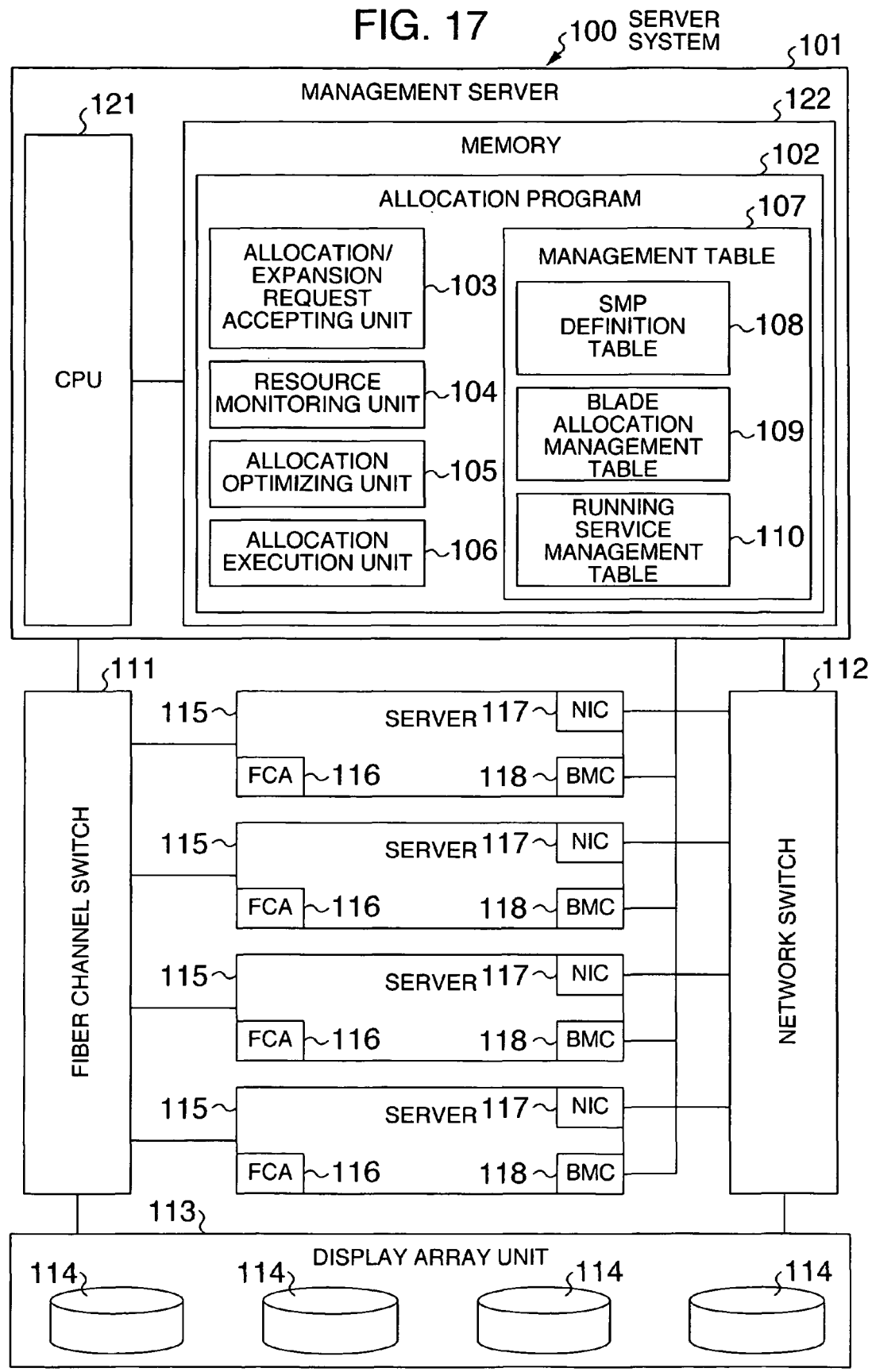
FIG. 17 is a diagram showing an example of the construction of a server system according to the second embodiment of the invention.

FIG. 17 is a diagram showing the architecture of a server system according to the second embodiment. A server system 100 includes a management server 101, a plurality of servers 115 and a disk array unit 113.

Each server 115 is connected through an FCS (Fiber Channel Adapter) 116 to a fiber channel switch 111, and connected through an NIC (Network Interface Card) 117 to a network switch 112. Each server 115 is also connected through a BMC (Baseboard Management Controller) 118 to the management server 101. The fiber channel switch 111 is connected to the management server 101, disk array unit 113 and each server 115. Thus, each server 115 can access to the disk array unit 113 through the fiber channel switch 111. The network switch 112 is connected to the management server 101, disk array unit 113 and each server 115. Thus, the management server 101 can monitor and control the disk array unit 113 and each server 115 through the network switch 112. The disk array unit 113 is formed of hard disk units 114, and a CPU and memory (not shown). The construction of each server 115 will be later described in detail. The fiber channel switch 111 may be a general switch. This embodiment is not limited to the fiber channel switch.

The management server 101 is connected through the fiber channel switch 111 to the servers 115 and disk array unit 113. The management server 101 is also connected through the network switch 112 to the servers 115 and disk array unit 113. In addition, the management server 101 is connected through a network to the BMC 118 built in each server 115. Thus, by accessing to this BMC 118, the management server 101 can control the status of the hardware of each server 115, control the power supply and reset the server 115. In general, the BMC 118 is powered from a power supply separated from the server 115. Thus, even if the server 115 is not supplied with power, the management server 101 can remotely control the BMC 118 through the network.

The management server 101 monitors and, if necessary, controls the status of each of the server 115, fiber channel switch 111, network switch 112 and disk array unit 113 through the network. The management server (also called management unit or service processor) 101 includes a CPU 121 and memory 122. The management server 101 can realize a predetermined function when the CPU 121 executes an allocation program 102 stored in the memory 122. In this case, the predetermined function is to control the services to be run on the plurality of servers 115 to be newly allocated or expanded (scale-up and scale-out implementation).

The allocation program 102 includes an allocation/expansion request accepting unit 103, a resource monitoring unit 104, an allocation optimizing unit 105, an allocation executing unit 106 and a management table 107. When a system administrator requests for a new allocation of a service to run to the servers 115 or for expansion of service through input means (such as keyboard and mouse, not shown) of management server 101, the allocation/expansion request accepting unit 103 accepts the request. The resource monitoring unit 104 monitors the situation of CPU resources to the running services on servers 115. The allocation optimizing unit 105 responds the order from the allocation/expansion accepting unit 103 or resource monitoring unit 104 to determine the resource allocation to servers 115. The allocation executing unit 106 reflects the result of the resource allocation determined by the allocation optimizing unit 105 on the plurality of actual servers 115. The management table 107 includes an SMP definition table 108, a blade allocation management table 109 and a running service management table 110. Each table will be later described in detail.

Figure 18:
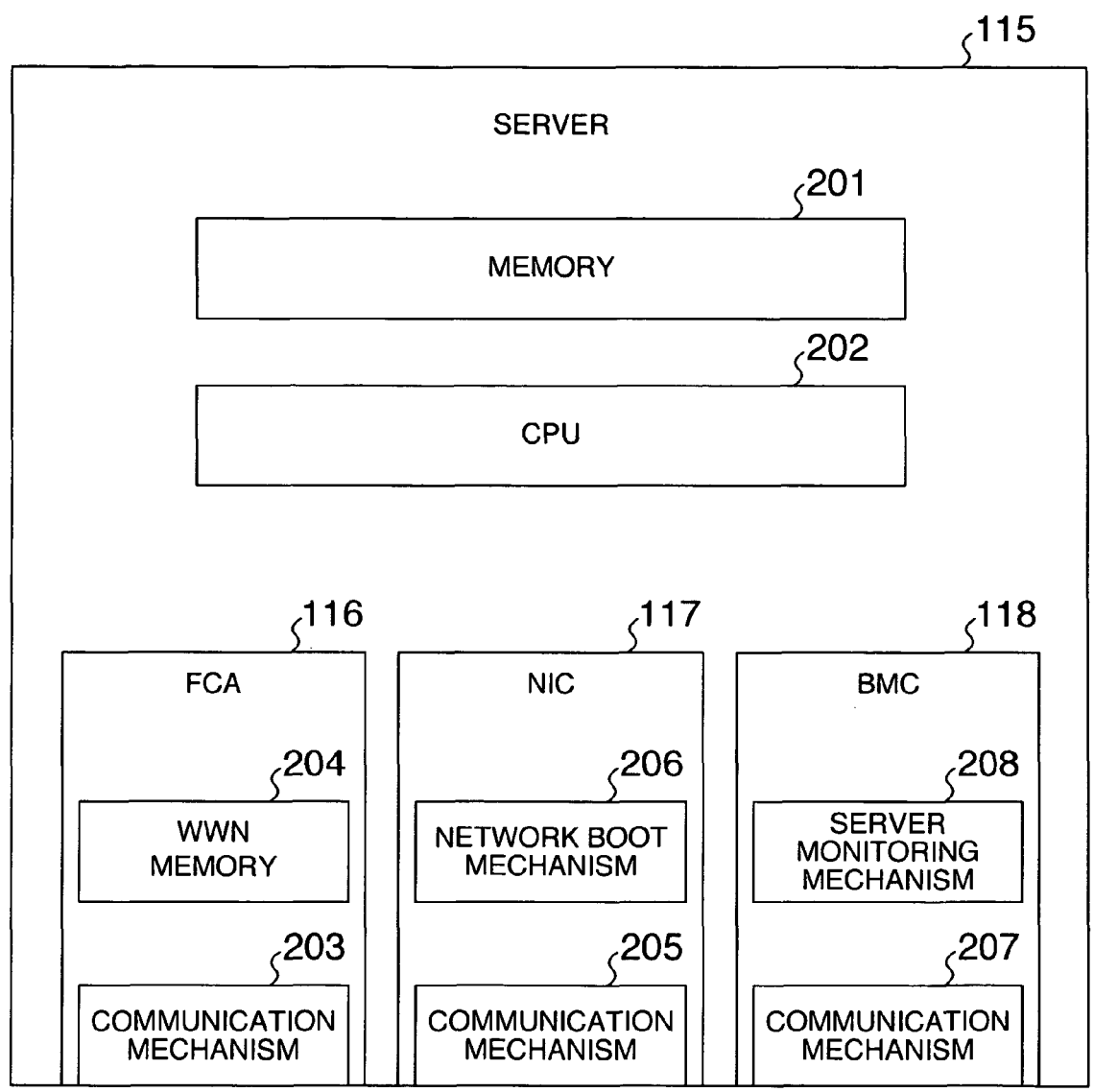
FIG. 18 is a diagram showing an example of the construction of the server.

FIG. 18 is a diagram showing an example of the construction of the server in this embodiment. The server 115 includes a memory 201, a CPU 202, the FCA 116, the NIC 117 and the BMC 118. The memory 201 stores a program and data. The CPU 202 executes the program stored in the memory 201.

The FCA 116 includes a communication mechanism 203 and a WWN (World Wide Name) storing memory 204. The communication mechanism 203 is connected to the fiber channel switch 111 so as to make fiber channel communication. The WWN storing memory 204 is a nonvolatile memory for storing WWN. The WWN is a unique device identifier necessary for the fiber channel communication, and is given to each node (including server 115) connected to the fiber channel switch 111. The WWN can identify the opponent of communication of fiber channel. The communication mechanism 203 makes fiber channel communication while it is referring to the WWN within the WWN storing memory 204.

The NIC 117 includes a communication mechanism 205 and a network boot mechanism 206. The communication mechanism 205 is connected to the network switch 112 so as to make network communication. The network boot mechanism 206 can be operated at the time of booting the server 115, and has the function to acquire a program necessary for booting server 115 through a network.

The BMC 118 chiefly monitors and controls the hardware of server 115. The BMC 118 includes a communication mechanism 207, and a server monitoring mechanism 208. The communication mechanism 207 transfers information of hardware of server 115 and accepts/transfers control commands. The communication mechanism 207 can be realized by a general network connection device. The server monitoring mechanism 208 detects an abnormality occurring in the hardware of server 115, and notifies the communication mechanism 207 of this fact. Then, the communication mechanism 207 notifies the management server 101 of the abnormality through a network. In addition, a device in a remote place (including management server 101) can make the power supply to the server 115 be turned on and off and the hardware be reset through the communication mechanism 207. Therefore, the BMC 118 is generally powered by a power supply separated from that to the server 115, and thus the power supply to server 115 can be remotely controlled through the communication mechanism 207 even if the power supply to server 115 is in the off state.

(Connection Type of Server (CPU Blade))

Figure 19:
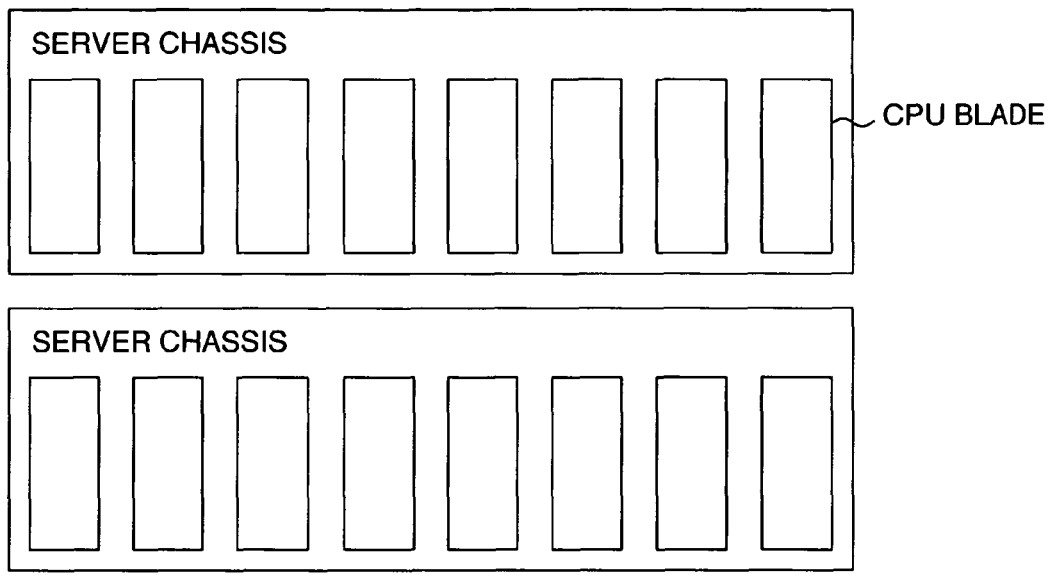
FIG. 19 is a diagram showing an example of the servers mounted.

FIG. 19 is a diagram showing an example of the type of server connection in this embodiment. The server chassis corresponds to the blade server (computer unit) having a plurality of CPU blades (computers, blades) that constitute one logic computer. Each CPU blade corresponds to a single server 115 shown in FIG. 17. A plurality of CPU blades can be enclosed in the server chassis. In this embodiment, 8 CPU blades can be enclosed in a single server chassis. In addition, a plurality of server chassis may be provided. The plurality of server chassis (blade server) is called blade system. The management server 101 shown in FIG. 17 can manage a plurality of server chassis and a plurality of CPU blades enclosed in each of the server chassis.

Figure 20:
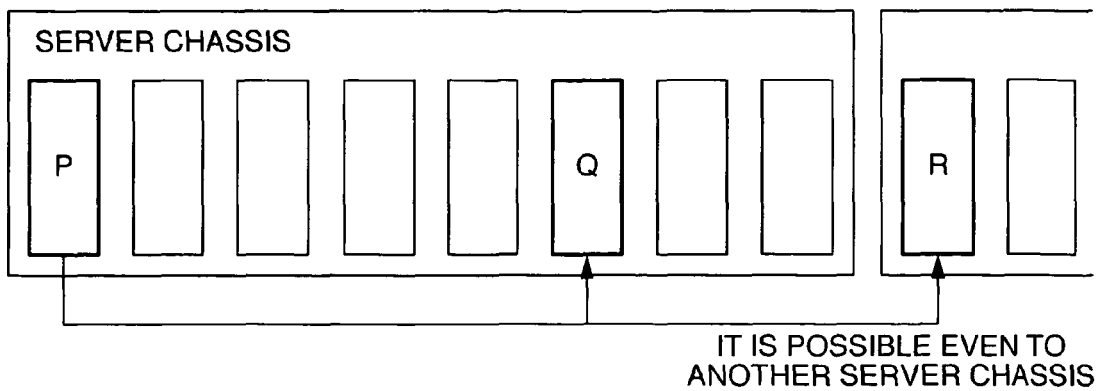
FIG. 20 is a diagram showing the scale-out of CPU blades.

FIG. 20 is a diagram showing the scale-out of CPU blade. When the service on the CPU blade P at the left end within the server chassis is scaled out, it does not need to expand to the adjacent CPU blade, but may expand to, for example, CPU blade Q. In addition, it may be scaled out to a different unit (the details of which will be described later) or a CPU blade R in another server chassis. In other words; in the scale-out implementation, the service can be expanded to any free CPU blade irrespective of whether it exists within its own server chassis or within other separate server chassis.

Figure 21:
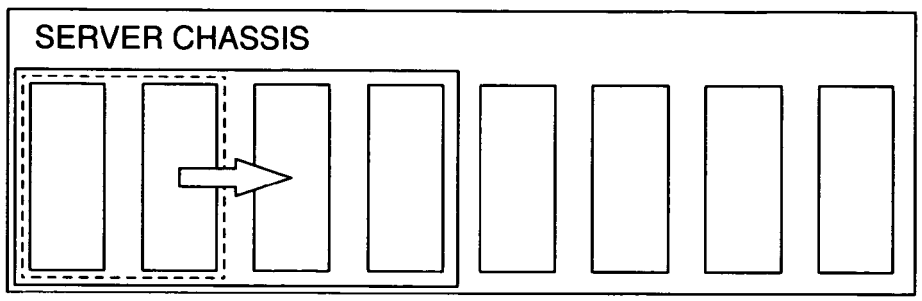
FIG. 21 is a diagram showing the scale-up of CPU blades.

FIG. 21 is a diagram showing the scale-up of CPU blade. The CPU blade is constructed to be of an SMP type (symmetric multiple processor using two or more CPUs). The service to run on this SMP structure can be scaled up. For example, the SMP structure formed of two CPU blades can be scaled up to an SMP structure formed of four CPU blades, thus improving the performance for processing a certain service. Although the SMP structure often has a common memory, this embodiment may be even a system architecture using a plurality of CPUs (computers or blades) that can constitute a single logic computer, and thus this embodiment is not limited to the SMP structure.

Figure 22:
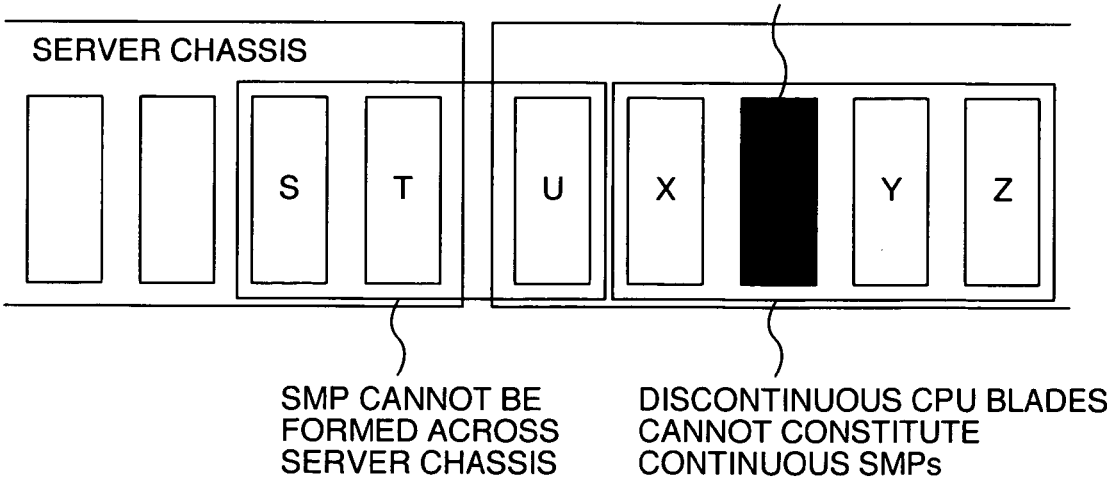
FIG. 22 is a diagram showing the restriction to the scale-up of CPU blades.

FIG. 22 is a diagram showing the limit of scale-up of CPU blade. As the limit of scale-up, the SMP cannot be constructed across the server chassis. As, for example, shown in FIG. 22, if CPU blades S and T make an SMP, this SMP cannot be scaled up to an SMP further including CPU blade U enclosed in another chassis. In addition, if a CPU blade is not inserted in the slot adjacent to the CPU blade to be used for scale-up, or if the CPU blades to be used for sale-up are discontinuously arranged, any SMP cannot be built up. As, for example, shown in FIG. 22, if there is an SMP of CPU blades Y and Z, it cannot be scaled up to another SMP further using the left-side CPU blade X with a vacant slot skipped over. After all, scale-up scheme can be performed when the CPU blades are deployed in the sequential slots within a single chassis or unit.

This restriction to the SMP of CPU blades is necessary to make the CPU blades be closely coupled. In other words, in order for the close coupling to be achieved, the bus for coupling the CPU blades is desired to have high performance (particularly, high communication performance) (or a deployment is necessary to increase the access speed between CPU blades). In this case, the connection distance must be shortened the more, the higher the performance of bus. Therefore, since the distance between the CPU blades is required to decrease, discontinues arrangement of CPU blades within the server chassis and deployment of CPU blades over two or more server chassis make it impossible to construct any SMP.

Figures 23, 24:
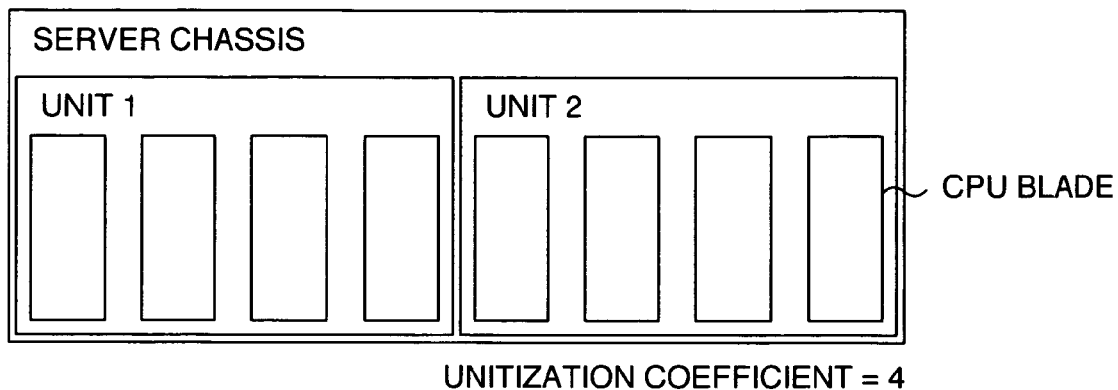
FIG. 23 is a diagram showing the definition of terms.
FIG. 24 is a diagram showing details of SMP definition table.

FIG. 23 is a diagram showing the definition of terms used in this embodiment. The maximum number of CPU blades that can be used to assemble SMP is called "unitization coefficient". If the maximum number of constituents of an SMP is, for example, four CPU blades, the unitization coefficient is 4. As shown in FIG. 23, this embodiment employs a unitization coefficient of 4. In this case, unit 1 and unit 2 are formed on a single chassis, but they are not connected. The unit 1 and unit 2 each of which has a unitization coefficient of 4 may be respectively built up on separate server chassis.

(Structure of Table)

FIG. 24 is a diagram showing the details of the SMP definition table 108 shown in FIG. 17. The SMP definition table 108 defines a rule for SMP structure. The SMP structure rule is previously produced by the system administrator. The SMP definition table 108 has a column of combination # 1081 in which serial numbers for allowable combinations are written. The types of SMP structure are written in the columns of CPU slots # 1082. If a single CPU blade is 2-way CPU, four servers each of which is a two-way SMP using a CPU blade can be built within a single unit. In addition, if two CPU blades of 2-way CPU each are used, two 4-way SMP servers can be built up in the single unit. Moreover, since the maximum number of CPU blades for SMP is four, a single 8-way SMP server can be constructed in the single unit. Therefore, a server corresponding to the smaller number in combination column # 1081 can improve its performance the more. In this case, however, all CPU blades must be inserted in the slots of the single unit. In addition, the status of "FREE" shown in FIG. 24 indicates that the CPU blade is inserted in the slot but not used yet as a constituent of the SMP.

As illustrated in FIG. 24, the combination number # 2, and # 4~7 sequentially use CPU slots from CPU slot # 1 in ascending order, but they may sequentially use CPU slots from CPU slot # 4 in descending order. In addition, since the slots are required to select in sequence, an SMP formed of, for example, slots # 2 and # 3 can be employed.

Figure 25:
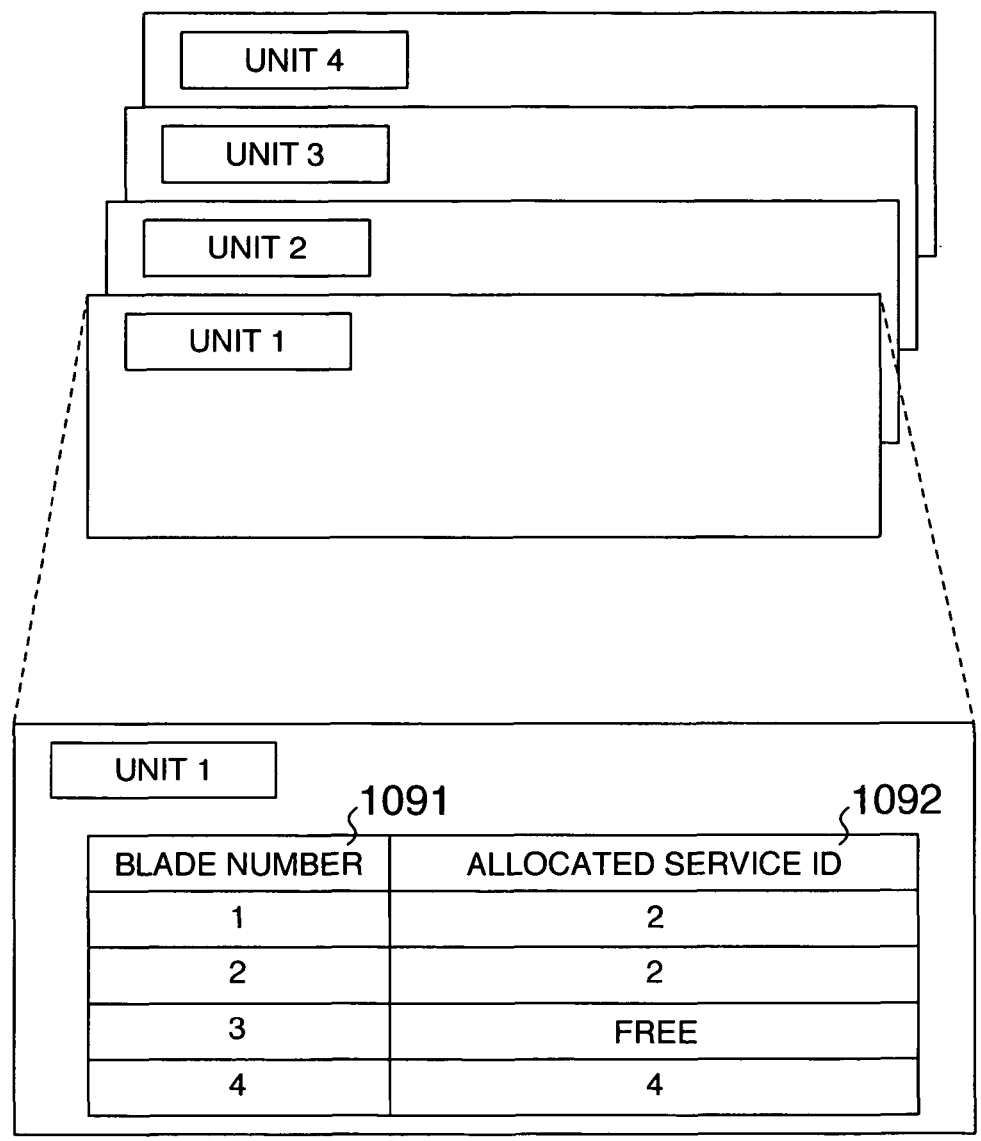
FIG. 25 is a diagram showing details of blade allocation management table 109.

FIG. 25 is a diagram showing the details of the blade allocation management table 109 shown in FIG. 17. The produced blade allocation management table 109 has tables of which the number corresponds to that of units. The table for each unit holds the situation in which CPU blades are allocated to that unit. Each table of blade allocation management table 109 is formed of records including columns of a blade number 1091 and an allocated service ID 1092. The column of blade number 1091 has CPU blade numbers stored as indexes. The blade numbers of the column 1091 respectively correspond to the CPU slot numbers # of the row 1082 of the SMP definition table 108. The column of allocated service ID 1092 has service IDs stored allocated to the CPU blades of blade number 1091. The service ID will be described with reference to FIG. 26.

FIG. 26 is a diagram showing the details of the running service management table 110 shown in FIG. 17. The running service management table 110 manages the services running on the CPU blades and the information for managing the services. The running service management table 110 is formed of records including a column of service ID 1101, a column of service name 1102, a column of service characteristic 1103 and a column of expansion type 1104. The column of service ID 1101 indicates the indexes attached as unique numbers to the running services (service names) that are registered in the running service management table 110. The column of service name 1102 indicates the names of running services set therein, such as names of a DB application and WEB application as general types and the names of specific applications. The column of service characteristic 1103 has "REBOOTABLE" or "NOT REBOOTABLE" set therein to indicate whether the corresponding CPU blade can be rebooted after the service is stopped at the time of executing the process for the automatic allocation to blade. The column of expansion type 1104 has "SCALE-UP" or "SCALE-OUT" set therein as a service expansion type.

FIG. 27 is a diagram showing the details of the allocation request information 271. The allocation request information 271 is the information necessary for allocating CPU resource when the system administrator freshly causes a service to run. The system administrator operates the input means (keyboard and mouse not shown) of the management server 101 (see FIG. 17) to enter the allocation request information 271 in the allocation/expansion request accepting unit 103. The allocation of CPU resource is determined according to the allocation request information 271. The allocation request information 271 has records including a column of service name 272, a column of service characteristic 273, a column of expansion type 274 and a column of performance requirement 275, and a field of blade-allocation automatic execution flag 276. The service name 272 is the same as the service name 1102 shown in FIG. 26. The service characteristic 273 is the same as the service name 1103 shown in FIG. 26. The expansion type 274 is the same as the expansion type 1104 shown in FIG. 26. The performance requirement 275 indicates the necessary number of ways of CPU. The blade-allocation automatic execution flag 276 indicates whether the CPU blades can be allocated without the approval of the system administrator.

Figure 28:
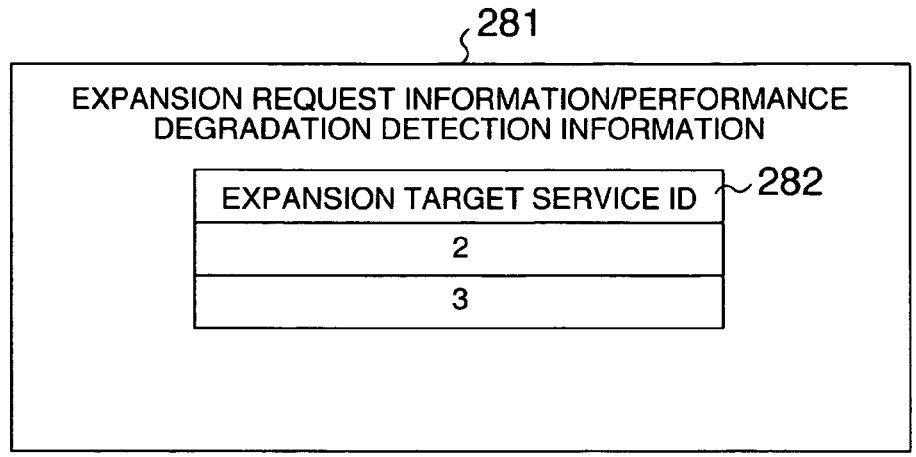
FIG. 28 is a diagram showing expansion-request information/performance-degradation-detection information.

FIG. 28 is a diagram showing the expansion-request information/performance-deterioration-detection information 281. This information 281 is produced when the allocation/expansion request accepting unit 103 accepts the request for the CPU-resource expansion to the existing service from the system administrator through the input means or when the resource monitoring unit 104 detects the lack of CPU resource for running service. The information 281 has a record including a column of expansion target service ID 282. The expansion target service ID 282 is the service ID that is required to allocate to CPU blade, and corresponds to the service ID 1101 of the running service management table 110 (see FIG. 26). Therefore, if the running service management table 110 is searched with the ID 282 used as a key, the information of the service names to be expanded can be acquired. Although it is here assumed that the performance requirement is 2-way (a single CPU blade) as default, the performance requirement can be changed by the system administrator or according to the lack of CPU resource detected by the resource monitoring unit 104.

The allocation/expansion accepting unit 103 acquires the expansion target service ID 282 by taking, for example, the following procedure. That is, the service names already allocated are displayed on display means (such as a display device not shown) of management server 101. Then, the selected service name that the system administrator requested to expand is searched for by referring to the displayed service names of the column of service name 1102 of running service management table 110. The service ID 1101 of the matched service name 1102 is taken as expansion target service ID 282.

(System Process)

Figure 29:
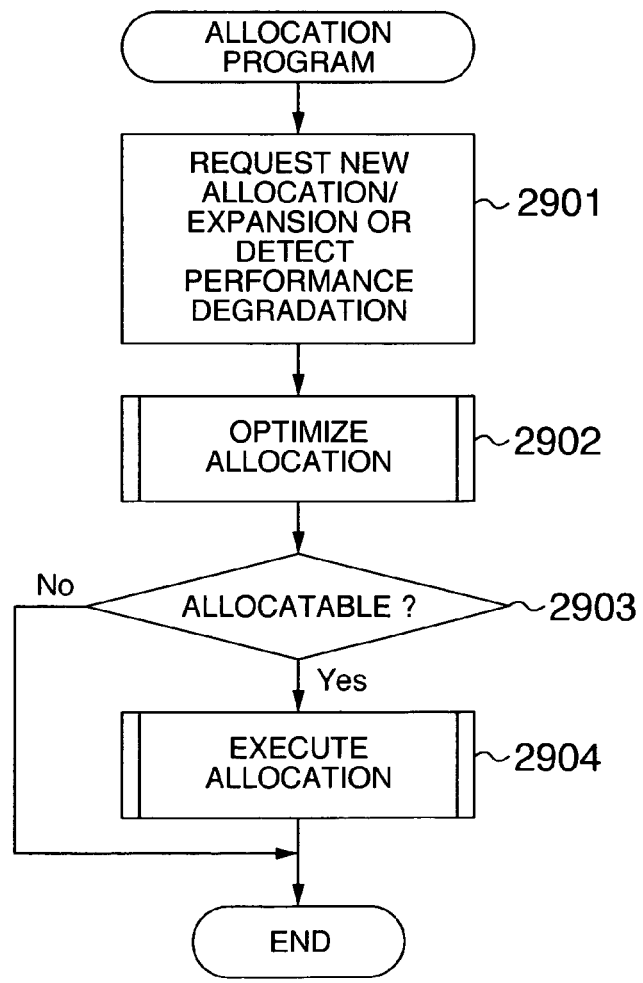
FIG. 29 is a flowchart of an allocation program of management server.

FIG. 29 is a flowchart of the allocation program 102 of management server 101. First, the allocation/expansion request accepting unit 103 of allocation program 102 accepts a new allocation-request/expansion-request from the system administrator (step 2901). In this case, the resource monitoring unit 104 sometimes detects performance degradation. In other words, the process for allocating CPU blades which will be described below is triggered by the allocation/expansion request accepting unit 103 or resource monitoring unit 104. Then, the allocation optimizing unit 105 receives necessary information from the accepting unit 103 or monitoring unit 104, and decisively optimizes the allocation position of CPU blade (step 2902). Then, judgment is made of whether the allocation program 102 can allocate a CPU blade according to the result of step 2902 (or whether the result of the allocation can be actually reflected on the hardware) (step 2903). If the allocation is possible (YES in step 2903), the allocation executing unit 106 executes the allocation of the CPU blade (step 2904). If the allocation is not possible (NO in step 2903), the program ends without making the allocation.

Figure 30:
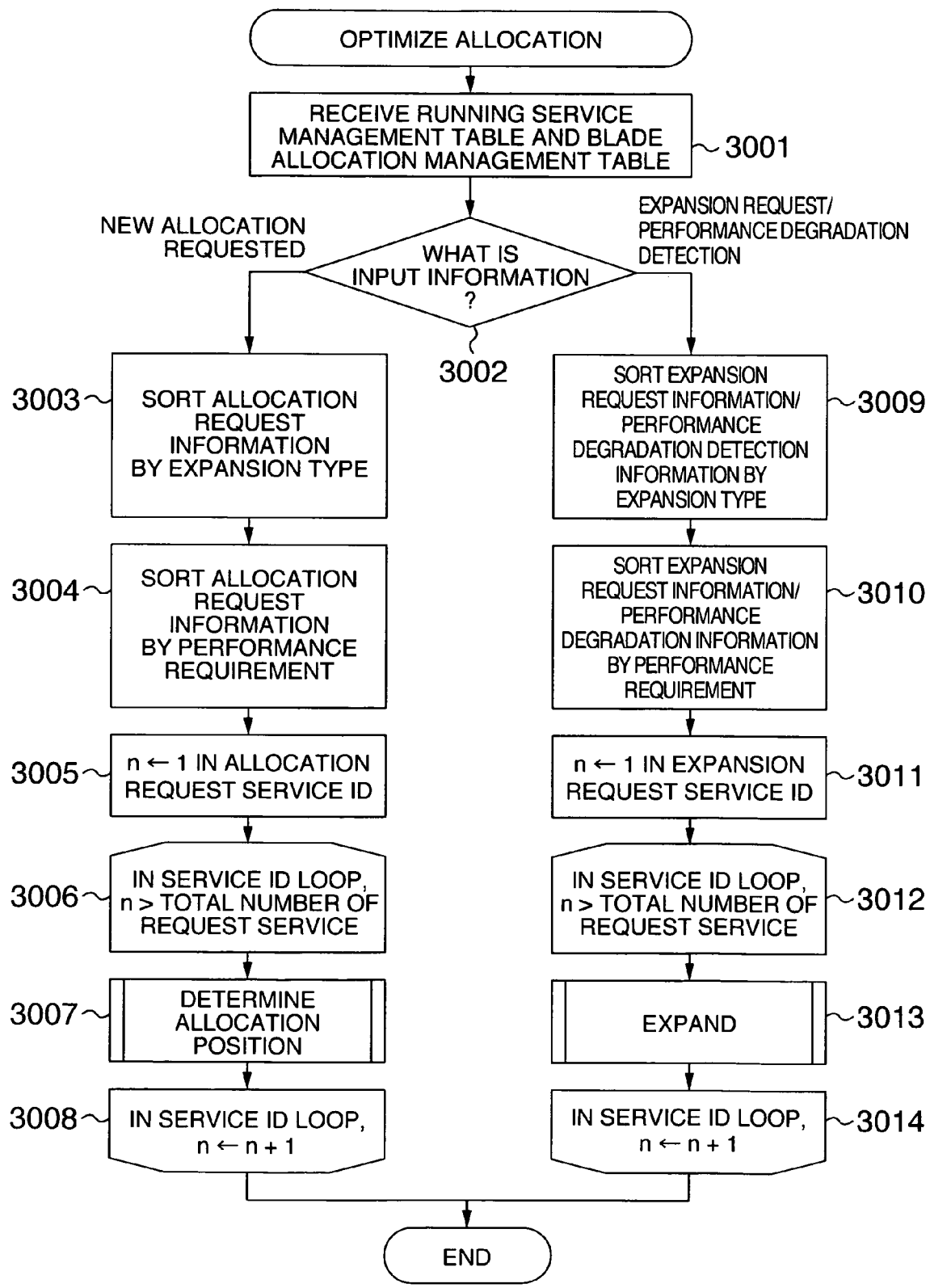
FIG. 30 is a detailed flowchart for optimizing the allocation.

FIG. 30 is a detailed flowchart of the allocation optimization (step 2902) shown in FIG. 29. First, the allocation optimizing unit 105 of management server 101 receives the running service management table 110 and blade allocation management table 109 (step 3001). Then, judgment is made of whether the information from the accepting unit 103 or resource monitoring unit 104 is a new allocation request or an expansion-request/performance-degradation detection (step 302).

If the input information indicates a new request for allocation, the allocation optimizing unit 105 makes the allocation-request information 271 (see FIG. 27) be sorted by expansion type 274 (step 3003). Thus, the record of the allocation request information 271 can be grouped into types of scale-up and scale-out. The rule for priority level is the order of scale-up >scale-out. In addition, the allocation request information 271 is sorted for each group of scale-up and scale-out by performance requirement 275 (step 3004). Thus, the records of allocation request information 271 for each group can be rearranged in the order of severity (larger number of way) of performance requirement 275. In other words, the priority rule takes the order of 8-way>6-way>4-way>2-way. Thus, the records of allocation request information 271 can be arranged in the priority order for the allocation process.

FIG. 31 is a diagram showing the allocation request information resulting from arranging the allocation request information 271 shown in FIG. 27 in the priority order. As illustrated in FIG. 31, the four records are classified as scale-up and scale-out, and the records of scale-up group are arranged in the order of severe performance requirement. The service ID 312 is given after being sorted in the priority order, and in the later processing the service ID is used as allocation request service ID.

Referring back to FIG. 30, the allocation positions for each service are determined in the priority order. First, the variable n of allocation request service ID is initialized to be 1 (step 3005). Then, the allocation position is repeatedly determined (step 3007) for each increment, +1 (step 3008) of the service ID (n) until the service ID (n) exceeds the total number of requested services (3006). The detection of the allocation position will be later described in detail.

If the judgment result of step 3002 is the expansion-request information/performance-degradation detection, the allocation optimizing unit 105 sorts the expansion-request information/performance-degradation detection information 281 (see FIG. 28) by expansion type 1104 (see FIG. 26) (step 3009). In this case, the expansion target service ID 282 indicates the existing service ID and corresponds to the service ID 1101 (see FIG. 26). Thus, the expansion type 1104 can be identified by referring to the corresponding record of running service management table 110. In addition, the expansion-request information/performance-degradation detection information 281 is sorted by performance requirement for each group of scale-up and scale-out (step 3010). The performance requirement in this case is 2-way as default. However, when the system administrator operates the resource monitoring unit 104 to set another value, the step 3010 becomes effective. Thus, the records of expansion-request information/performance-degradation detection information 281 can be arranged in the priority order for allocation process. The expansion request service ID is given to each record according to the priority order, and used in the following processes.

Then, expansion process is performed for each service in the priority order. First, the variable n of expansion request service ID is initialized to be 1 (step 3011). Then, the expansion process is repeatedly performed (step 3013) for each increment, +1 (step 3014) of service ID (n) until the service ID (n) exceeds the total number of request services (step 3012). The expansion process will be later described in detail.

Figure 32:
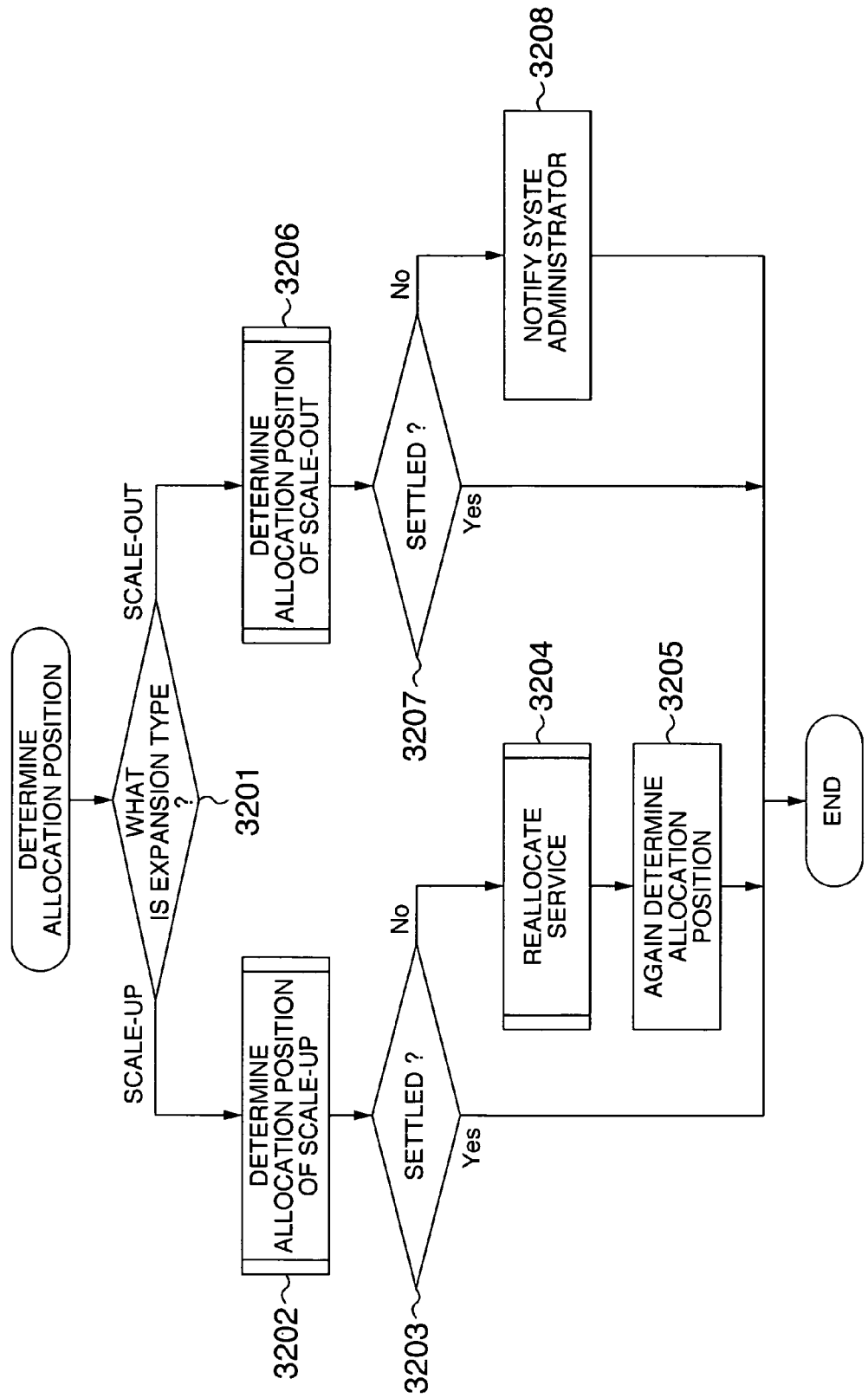
FIG. 32 is a flowchart for determining allocation position.

FIG. 32 is a flowchart for the determination of allocation position (step 3007) in FIG. 30. The allocation optimizing unit 105 refers to the expansion type 274 of allocation request information 271 (step 3201), and the determination of allocation position is performed either for scale-up (step 3202) or for scale-out (3206) according to the expansion type. If the determination of allocation position for scale-up cannot be settled (NO in step 3203), reallocation of service is made so that the service allocated to other CPU blade within the corresponding unit can be allocated to another unit (step 3204). Then, the determination of allocation position is again executed (step 3205). In this case, the number of times (for example, once) that the determination is executed is previously decided so that the process for the determination of allocation position can be prevented from taking an infinite loop. If it can be cleared up (YES in step 3203), the program ends.

If the determination of allocation position for scale-out cannot be cleared up (NO in step 3207), this case means that there is not any free CPU blade. Thus, the allocation optimizing unit 105 notifies the system administrator of the fact that there is not any free CPU blade (step 3208). Specifically, the system administrator is informed by using display means (such as a display device not shown) of management server 101 or sound emanating means (such as a loud speaker not shown) (hereinafter, the same is made for the notice to the system administrator). If it can be cleared up (YES in step 3207), the program ends.

Figure 33:
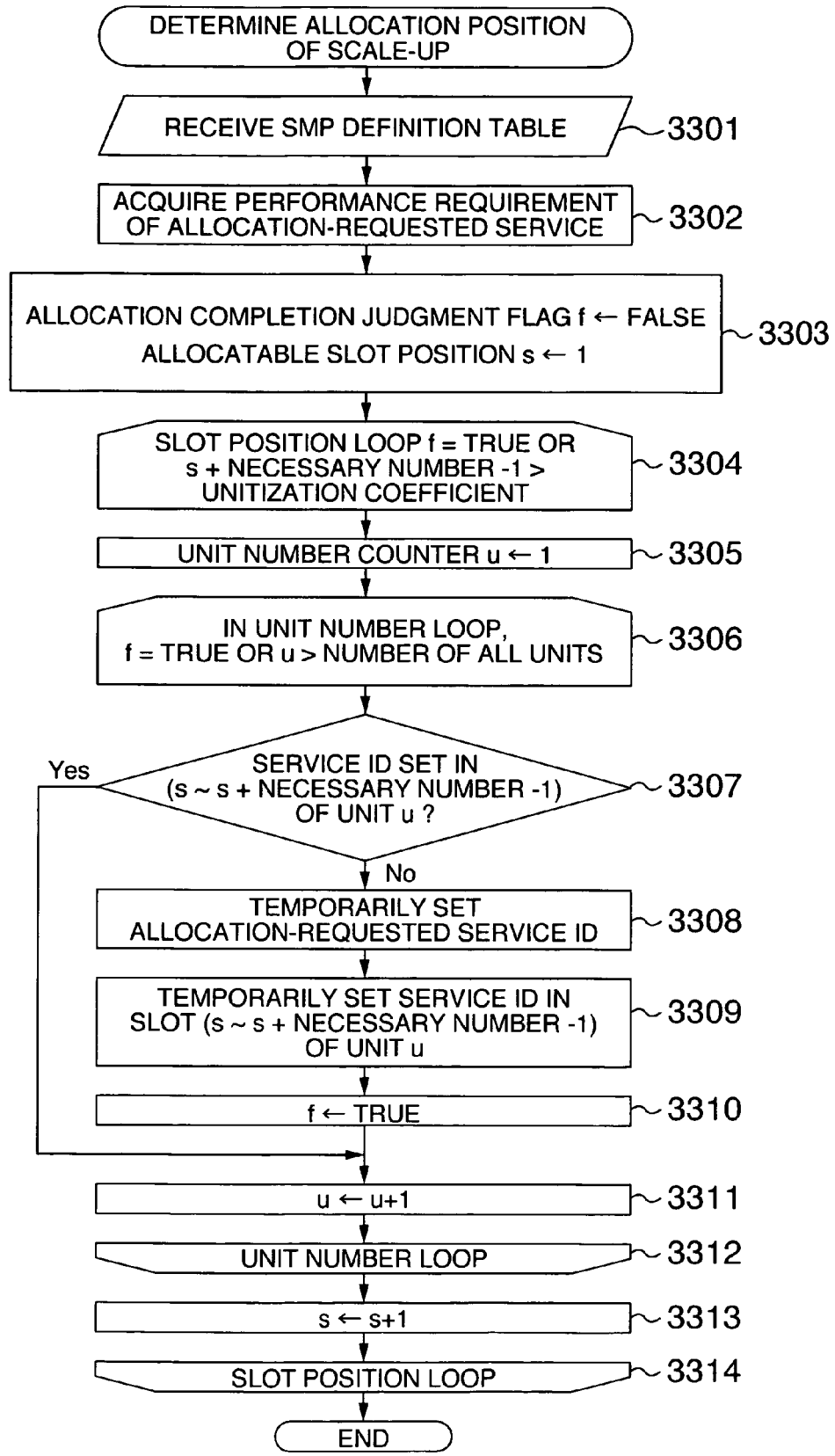
FIG. 33 is a detailed flowchart for determining the allocation position for scale-up.

FIG. 33 is a detailed flowchart for the determination of allocation position for scale-up shown in FIG. 32 (step 3202). The service to be scaled up is allocated to the unit of which the leftmost (one end) CPU slot is found free. This is because the SMP is restricted to the deployment in which the blades are sequentially arranged within a unit and thus required to secure as many slots as possible for the expansion in the future.

First, the allocation optimizing unit 105 receives the SMP definition table 108 (see FIG. 24) (step 3301). Then, the performance requirement of the service of the allocation request is acquired (step 3302), and a necessary number of CPU blades are retained as a necessary number. In addition, for the initializing process before making steps 3304~3314, the allocation-completion judgment flag f is made FALSE, and the allocatable slot position s is made 1 (step 3303). Then, the processes (process for each slot position) of steps 3305~3313 are repeatedly performed until the condition of "f=TRUE" or "s+necessary number−1>unitization coefficient" can be satisfied (steps 3304~3314). In other words, if the condition of step 3304 is met, the process for the determination of allocation position is finished. Of the above conditions, the former means that the allocation of CPU blade has been completed. The latter means that the checking of if the allocation is possible for all slot positions has been completed.

As the process for each slot position, the allocation optimizing unit 105 first sets 1 in the unit number count u (step 3305). This process is the initializing step before the steps 3306~3312. Then, the processes of steps 3307~3311 (process for each unit associated with a predetermined slot position) until the condition of "f=TRUE" or "u>number of all units" can be satisfied (steps 3306~3312). In other words, if the condition of step 3306 is met, the process for each unit associated with a predetermined slot position ends. Of the above conditions, the former condition means that the allocation of CPU blades has been completed. The latter means that the checking of if the allocation is possible for all units associated with a predetermined slot position has been completed.

As the process for each unit associated with a certain slot position, the allocation optimizing unit 105 first refers to the blade allocation management table 109 to check if the service ID is completely set in the slot (position=s~s+necessary number−1) of a unit (number=u) (step 3307). If, for example, s=1 and necessary number=3, checking is made of if the blade number 1091 (see FIG. 25) of 1~3 (=1+3−1) is completely set in the slot positions. If the service number is not set yet (NO in step 3307), the allocation-requested service ID is temporarily set in the running service management table 110 (step 3308). In addition, the allocation-requested service ID is temporarily set in the slots (position=s~s+necessary number−1) of a unit (number u) of blade allocation management table 109 (step 3309). Specifically, the allocation service ID 1092 of the corresponding blade number 1091 is temporarily set in the slot position. At this time, it is confirmed whether the SMP temporarily set up is matched to the rule by referring to the SMP definition table 108 entered in step 300 of FIG. 30. Then, the allocation-completion judgment flag f is made TRUE (step 3310).

In this case, the reason for taking "temporary setting" is that the system administrator sometimes does not actually make allocation of service depending on the administrator's mood. The final decision is performed in the allocation execution (step 2904) shown in FIG. 29.

In step 3307, if the setting is completed (YES in step 3307), the unit-number counter u is updated to increment by +1 (step 3311), and checking is made of if the allocation is possible for the next unit associated with a predetermined slot position (step 3307). Thus, the process for each unit is performed about certain slot positions. If the allocation is not possible even after checking for all units, s is updated by incrementing by +1 so that the slot position to be checked can be set (step 3313), and the process for the slot position is started (step 3305). Thus, the process is made for each slot position.

When the service ID is allocated (steps 3308~3310), f becomes TRUE to satisfy the condition of step 3306. Thus, the processing gets away from the processes of steps 3306~3312. In addition, since the condition of step 3304 is satisfied, the processing gets away from the processes of steps 3304~3314, and the program ends the process for the determination of allocation position. In addition, if the allocation is not possible even after checking is made for all allocatable slot positions, the latter condition of step 3304 is satisfied, and thus the process for the determination of allocation position ends under the state of allocation-completion judgment flag f=FALSE.

Figure 34:
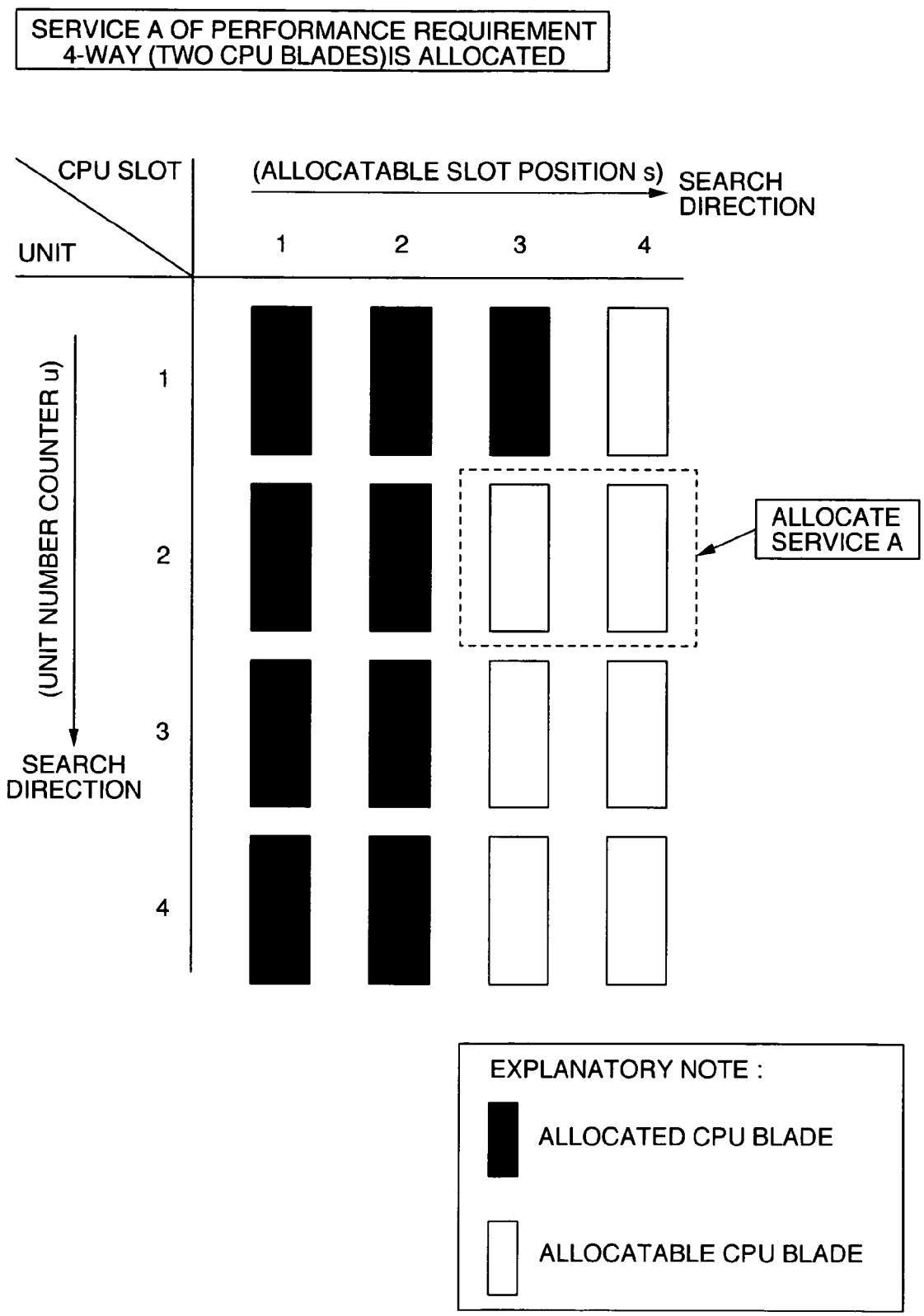
FIG. 34 is a diagram showing the allocation of CPU slots within a unit.

As described above, the process for the determination of allocation position for scale-up is performed to search for a unit having a free CPU slot at its leftmost position. If the allocation state is as shown in FIG. 34, the service A is allocated to slots 3 and 4 of unit 2.

Figure 35:
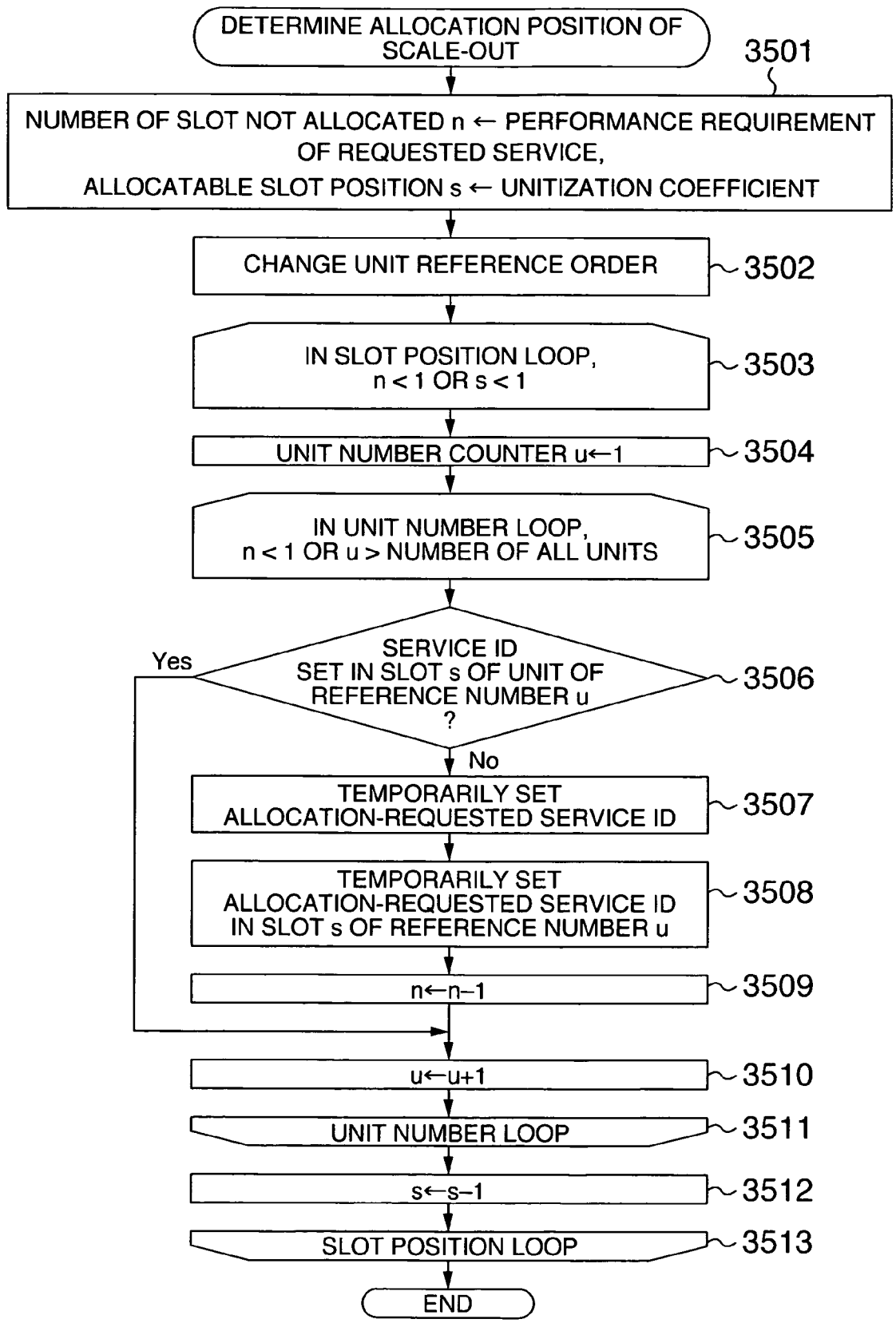
FIG. 35 is a detailed flowchart for determining the allocation position for scale-out.

FIG. 35 is a detailed flowchart for the determination of allocation positions for scale-out (step 3206) shown in FIG. 32. The service to be scaled out is allocated to the free CPU slots of each unit one by one that are preferably located at the rightmost end (other end). This is because the deployment of slots for scale-out is required to perform not to interfere with the scale-up for selecting slots from the leftmost within each unit.

First, the allocation optimizing unit 105 makes the following process as the initializing process before making the processes of steps 3505~3513. That is, the number n of slots not allocated yet is considered as the number of CPU blades estimated from the performance requirement of a requested service (if the performance requirement is, for example, 2-way, n=1 is selected). In addition, the allocatable slot position s is used as the unitization coefficient (step 3501). Then, the order of referring to units is changed (step 3502). In this case, in the processes of steps 3505~3511, the order of referring to units is selected so that the units can be referred to not in the order of unit number, but in the order in which the number of free sequential slots is larger. This is because the scale-up implementation within each unit is required to preferably prevent from being blocked.

Then, the processes (process for each slot) of steps 3504~3512 are repeatedly performed until the condition of "n<1" or "s<1" is satisfied (steps 3503~3513). In other words, if the condition of step 3503 is satisfied, the process for the determination of allocation position ends. Of the above conditions, the former means that a necessary number of CPU blades have been allocated. The latter means that the checking of if the allocation is possible has been completely carried out for all slot positions.

For the process for each slot position, the allocation optimizing unit 105 first sets 1 in the unit-number counter u (step 3504). This process is the initializing process before making the processes of steps 3505~3511. The processes of steps 3506~3510 (the process for predetermined slot positions of each unit) are repeatedly executed until the condition of "n<1" or "u>the number of all units" is satisfied (steps 3505~3511). In other words, if the condition of step 3505 is met, the process for predetermined slot positions of each unit ends. Of the conditions, the former means that a necessary number of CPU blades have been allocated. The latter means that the checking of if the allocation is possible for predetermined slot positions of all units has been completed.

For making the process for predetermined slot positions of each unit, the allocation optimizing unit 105 first refers to the blade allocation management table 109 to check if the service ID has been set in the slots (positions=s) of the reference number u (step 3506). In this case, the reference number indicates the number of the order in which the units are referred to as set in step 3502. If the setting is not completed yet (NO in step 3506), the allocation requested service ID is temporarily set in the running service management table 110 (step 3507). In addition, the allocation requested service ID is temporarily set in the slots (position=s) of the unit of the reference number u of blade allocation management table 109 (step 3508). The "temporary setting" was previously described. Then, the number n of slots not allocated yet is updated by −1 (decrement) (step 3509). This means that since the processes of steps 3507 and 3508 have been performed, the number n of slots not allocated yet is decreased by 1. Then, the unit number counter u is updated by +1 (step 3510), and checking is made of if the allocation is possible for the next unit (step 3506).

Even if the service ID is completely set (YES in step 3506), the unit number counter u is updated by +1 (step 3510), and the checking is made of if the allocation is possible for the next unit (step 3506).

If the condition of step 3505 is satisfied, the allocatable slot position s is updated by −1 (step 3512), and the process for the next slot position is started (step 3504). If the former of the conditions of step 3505 is satisfied, a necessary number of CPU blades are considered as being allocated. Thus, the condition of step 3503 is met, and the process for determining the allocation position ends. In addition, even if the checking is made for all slot positions, the condition of n<1 cannot be satisfied, the process ends with the slots of n number not allocated yet.

Figure 36:
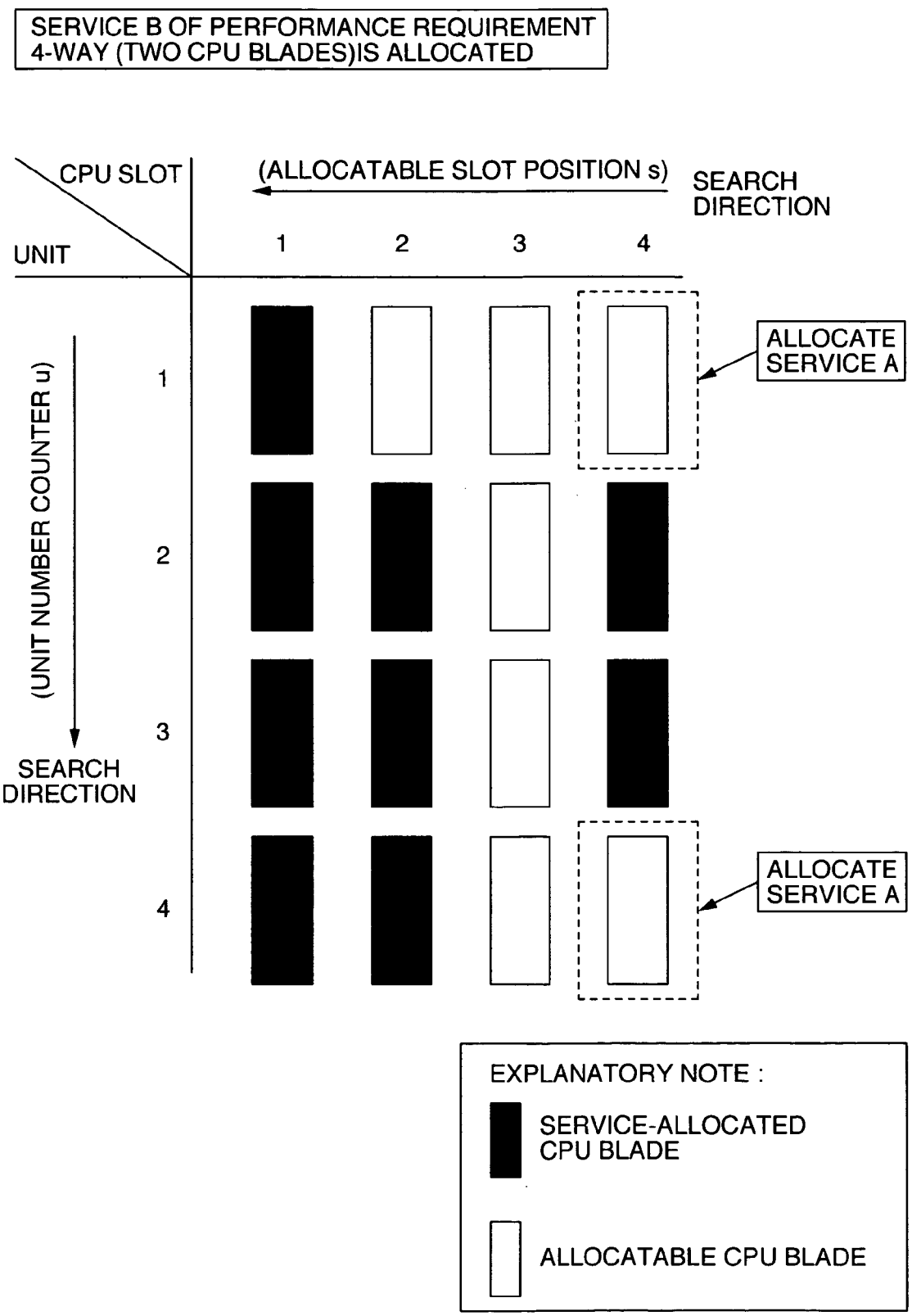
FIG. 36 is a diagram showing the allocation of CPU slots within a unit.

As described above, the process for determining the allocation position for scale-out is performed by searching for the units preferably having a free CPU slot at the rightmost end. In addition, it can be made by searching for the units having as many free sequential slots as possible. If the allocation deployment of slots is as, for example, shown in FIG. 36, the service A is allocated to the slot 4 of unit 1 and the slot 4 of unit 4.

FIG. 37 is a diagram useful for explaining the process for the change of unit reference number (step 3502) shown in FIG. 35. When services for scale-out are allocated, reference is first made to preferably the units in which scale-up services are not allocated, and then to the units having as many free sequential slots as possible. This is done for the purpose of avoiding the allocation reference from interfering with the expansion of scale-up service. The reference number is changed as unit 3, unit 4, unit 1 and unit 2 according to this rule.

Figure 38:
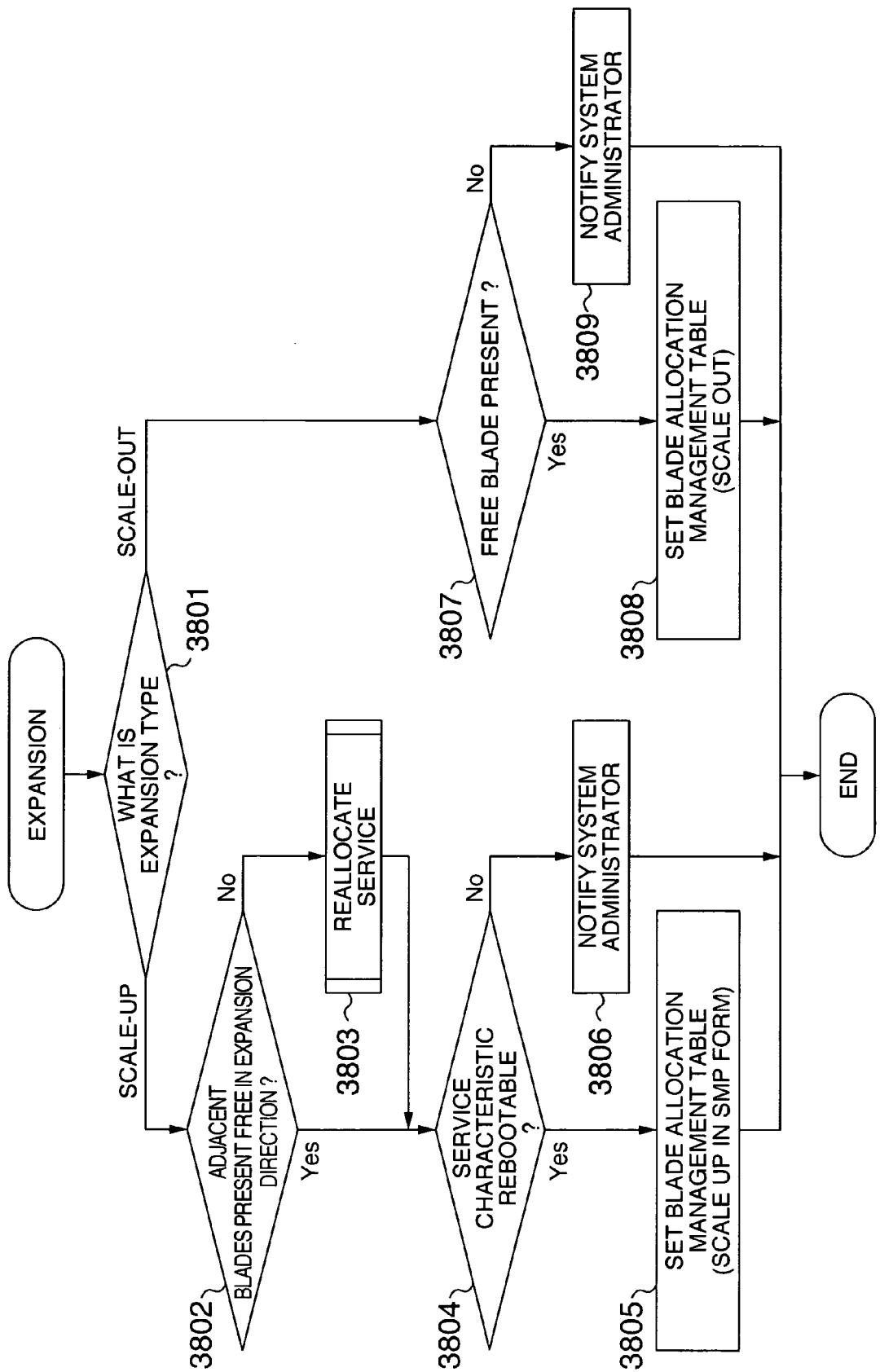
FIG. 38 is a diagram showing the detailed flow of processes for expansion.

FIG. 38 is a detailed flowchart of the expansion (step 3013) shown in FIG. 30. The allocation optimizing unit 105 first refers to the running service management table 110 received in the step 3001 shown in FIG. 30, and judges whether the expansion type 1104 of the service corresponding to the expanding service ID 282 of expansion-request information/performance-degradation detection information 281 (see FIG. 28) is scale-up or scale-out (step 3801). If it is scale-up ("SCALE-UP" in step 3801), the optimizing unit 105 first refers to the blade allocation management table 109 received at the step 3001 shown in FIG. 30, and judges whether there are any free CPU blades adjacent to the allocated CPU blades in the direction in which the corresponding service is already allocated to those blades (step 3802). Specifically, judgment is made of whether a necessary number of free CPU blades for the expansion exist adjacent to the right of the rightmost one of allocated CPU blades within the unit in which the corresponding service is already allocated to those CPU blades. If there are free blades (YES in step 3802), the program goes to step 3804. If there are not (NO in step 3802), the redeployment of blades for the service allocation is performed (step 3803).

Then, the allocation optimizing unit 105 refers to the service characteristic 1103 of running service management table 110, and judges whether the corresponding service can be rebooted or not (step 3804). If it can be rebooted (YES in step 3804), the blade allocation management table 109 is changed by setting (step 3805). Specifically, for the scale-up of SMP, the allocation service ID 1092 of blade allocation management table 109 is updated according to the service ID to be expanded so that the number of CPU blades to be allocated to the corresponding service can be increased. At this time, it is confirmed whether the established SMP structure conforms to the rule by referring to the SMP definition table 108 received in step 3001 shown in FIG. 30. If it cannot be rebooted (NO in step 3804), the system administrator is informed of this fact (step 3806). The flowchart shown in FIG. 38 shows the flow of processes not to expand if the service characteristic cannot be rebooted. However, it is possible to ask the system administrator about whether the rebooting is possible. If the rebooting is possible, the expansion can be made. In addition, if the rebooting is not possible, no intention of expansion can be explicitly clarified to the system administrator.

In step 3801, if the expansion type of the corresponding service is scale-out ("SCALE-OUT" in step 3801), the allocation optimizing unit 105 refers to the blade allocation management table 109, and judges whether there are a necessary number of free CPU blades (step 3807). If there are free CPU blades (YES in step 3807), the blade allocation management table 109 is set for scale-out (step 3808). Specifically, the allocation service ID 1092 of blade allocation management table 109 is updated according to the expanding service ID in order to expand in response to the allocation algorithm of the scale-out service. If there are not any free CPU blades (NO in step 3807), the service cannot be expanded, and thus the system administrator is notified of this fact (step 3809).

Figure 39:
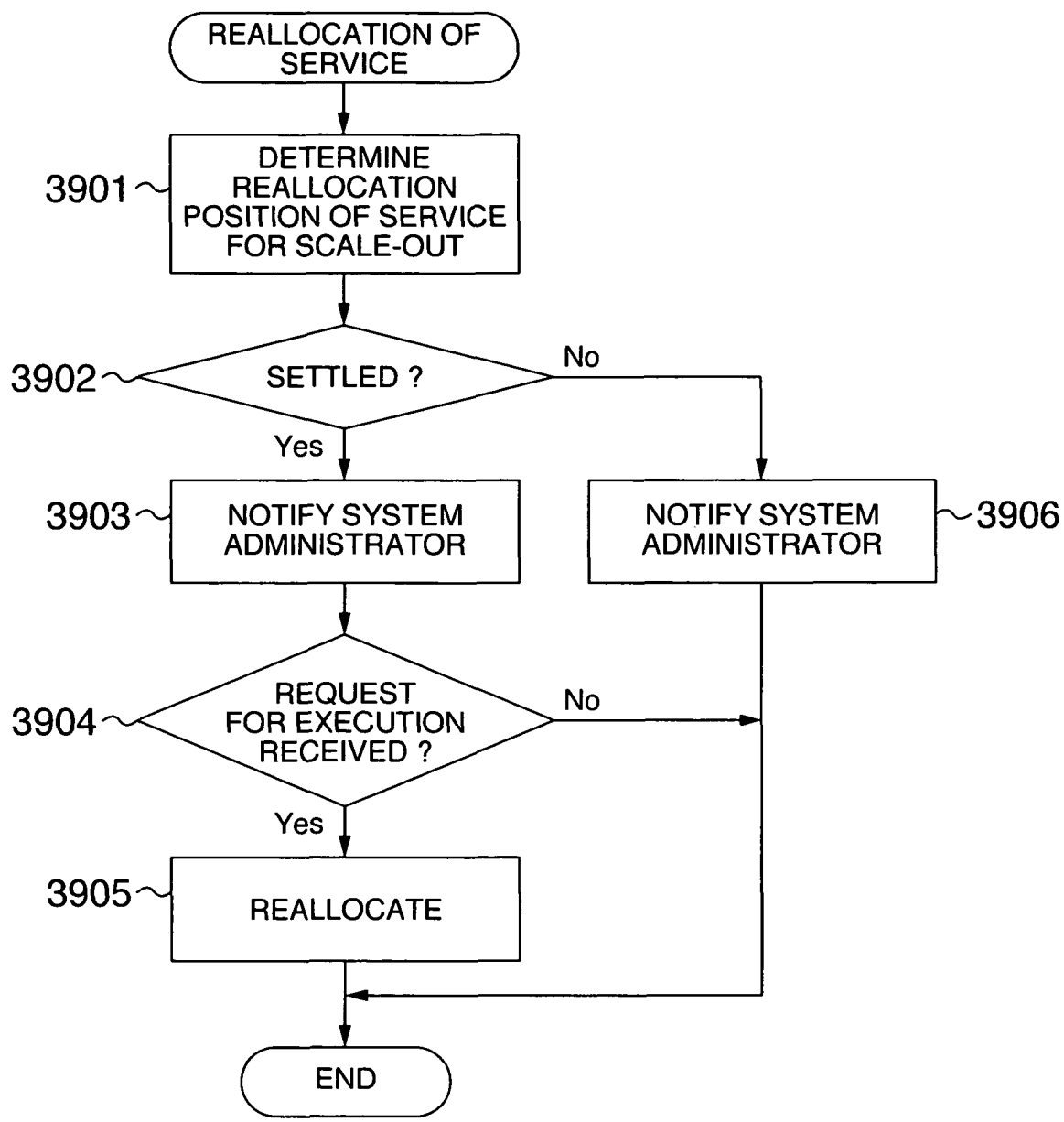
FIG. 39 is a detailed flowchart for service reallocation.

FIG. 39 is a detailed flowchart of the service reallocation (step 3204) shown in FIG. 32 and the service reallocation (step 3803) shown in FIG. 38. Since the processes for the service reallocation cannot scale up the corresponding service in the current service-allocated status, the service allocated to other CPU blades within the same unit is reallocated to the blades of another unit. The allocation optimizing unit 105 first determines the positions of the blades to which the service to be scaled out is reallocated (step 3901). Specifically, in order to reallocate to another unit the service that is already allocated from the right side to the CPU blades of the original unit, the allocation optimizing unit 105 checks if free CPU blades are present in other units by referring to the blade allocation management table 109, and determines the positions of free slots as reallocation positions. If the rightmost CPU blade is free within the original unit, this slot position can be employed as the reallocation position. Then, judgment is made of whether there are any free CPU blades, or the determination of reallocation positions has been settled (step 3902).

If the determination of reallocation positions is cleared up (YES in step 3902), the allocation optimizing unit 105 notifies the system administrator of this fact (step 3903). Then, if the system administrator receives the request for the execution of reallocation (YES in step 3904), the reallocation is performed (step 3905). Specifically, the allocation service ID 1092 of blade allocation management table 109 is updated to change the setting information of server 115 corresponding to the CPU blade, and then the server 115 is rebooted. The setting information change and rebooting of server 115 are carried out by issuing the associated request to the BMC 118. If the request for the execution of reallocation is not received (NO in step 3904), the program ends without making the reallocation. In step 3902, the determination of reallocation positions is not cleared up (NO in step 3902), the allocation optimizing unit 105 notifies the system administrator of this fact (step 3906), and closes the program.

FIG. 40 is a detailed flowchart of the execution of allocation (step 2904) shown in FIG. 29. The allocation execution unit 106 of management server 101 first informs the system administrator of the result of the determination of allocation position (step 4001). Then, judgment is made of whether the result is a new allocation (step 4002). This judgment process is made in the same way as the step 3002 shown in FIG. 30. If the result is a new allocation (YES in step 4002), judgment is made of whether the blade allocation automatic execution flag 276 of allocation request information 271 (see FIG. 27) is ON (step 4003). If it is not ON (NO in step 4003), the checking is made of whether the request for execution from the system administrator is received (step 4004). If it is not received (NO in step 4004), the actual allocation is not performed, and thus the temporary setting of the blade allocation management table 109 and running service management table 110 is cancelled and restored to the original status (step 4006). If the result is not a new allocation (NO in step 4002), and if the blade allocation automatic execution flag 276 is ON (YES in step 4003), or if the request for execution is received (YES in step 4004), the hardware structure is changed (step 4005). Specifically, after the change of the setting information of server 115 corresponding to the CPU to which the service is allocated, the server 115 is rebooted. The setting information change and reboot of server 115 is performed by issuing the corresponding request to the BMC 118. Thus, the temporary setting or setting of blade allocation management table 109 and running service management table 110 become effective.

According to the second embodiment of the invention mentioned above, when a service is freshly allocated to CPU blades or is expanded, the service of scale-up is allocated to CPU blades from the leftmost one of those blades that are sequentially arranged within the same unit. On the other hand, the service of which the expansion type is scale-out is allocated to a unit within which free CPU slots are preferably arranged on the right side. Therefore, as many free CPU blades as possible can be secured by which the service of scale-up type can be expanded. In addition, even if the service to be scaled up cannot be newly allocated or expanded without changing the current status, the service of scale-out type allocated to the CPU blades which makes the factor of the difficulty can be reallocated to the CPU blades of another unit, and thus it is possible to acquire free CPU blades to which the service of scale-up type is to be allocated.

Although the second embodiment of the invention has been explained as above, it can be also considered that the management server according to the second embodiment of the invention can be achieved by such processes that the programs (including the blade allocation program) to be executed in the constituents of the management server 101 shown in FIG. 17 are recorded on a recording medium that can be read out by a computer, read in from this recording medium and executed by the computer system. In this case, the programs may be supplied to the computer system through a network such as the Internet.

<<Other Embodiments>>

While two preferred embodiments of the invention have been given above, the present invention is not limited to those embodiments, but the invention can be variously changed without departing from the scope of the invention. For example, the following embodiments can be considered.

(1) While the SMP is formed of CPU blades of 2-way CPU as an example of scale-up as in the second embodiment, the CPU blades may be 1-way CPU. In addition, if the CPU blades are closely coupled, there is no need to employ the SMP.

(2) In the second embodiment, while the scale-up type service is allocated to CPU blades first from the leftmost one of the blades that are arranged in turn within a unit and the scale-out type service is allocated to the CPU blades first from the rightmost one of the blades arranged within the unit, those services may be respectively allocated to the CPU blades first from the opposite ones in the left/right relation to those mentioned above.

(3) While the management server 101 is provided in a chassis different from that of server 115 as shown in FIG. 17 in the second embodiment, the server 115 (CPU blade) provided within the blade server (the same chassis) and other CPUs may be used as management server 101.

According to the invention, since the servers can be orderly arranged as a group for each function type, the maintainability can be improved. In addition, according to the invention, if a failure of one server causes the loads on the other onboard servers to be unbalanced, the functions of the servers can be automatically transposed, and thus the processing ability of the blade system can be utilized to the fullest extent until the maintenance is completely finished. Also, according to the invention, when the computers to which functions are to be allocated are closely coupled (in which case a low-speed communication remarkably reduces the processing performance), functions are allocated to two or more computers that are deployed in order to increase the speed of communication between them. If the above deployment for the fast speed communication is not possible, functions for loose coupling (even low speed communication does not reduce the processing performance) are reallocated to other computers, and thus the freedom of scale-up can be enhanced so that the services (functions) can be allocated to the CPU blades (computers).

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A computer system comprising:
a plurality of computer units, each of said plurality of computer units includes a plurality of computers, and each of the computers has at least one CPU and a control device which changes configuration of computers;
wherein the computer system is adapted to include different configurations of computers in each of said plurality of computer units: a first computer configuration comprises at least two computers being successively disposed and closely coupled in a same computer unit, memories and I/O devices of the closely coupled computers are shared and CPUs of said at least two computers to function as a single computer; a second computer configuration comprises at least two computers which CPUs work to allow each of said at least two computers to function as a single computer independently,
the computer system further comprises a management server including SMP definition information defining allowable combinations of computers which form possible SMP combinations in a single computer unit, the management server performs: in a first case that there is a free computer which is disposed successively adjacent to a plurality of computers having the first configuration and forming a first SMP combination within a first computer unit of said plurality of computer units, instructing said free computer to operate as an element of a second SMP combination to be scaled-up to from said first SMP combination with reference to the possible SMP combinations defined in the SMP definition information to increase a number of cooperatively working CPUs; and
in a second case that there is a computer having the second configuration and performing an application, which is disposed successively adjacent to a plurality of computers having the first configuration and forming a first SMP combination within a first computer unit of said plurality of computer units, instructing a computer disposed in another computer unit than said first computer unit to perform said application on behalf of said computer having the second configuration, and instructing said computer having the second configuration to operate as an element of a second SMP combination to be scaled-up to from the first SMP combination with reference to the possible SMP combinations defined in the SMP definition information to increase number of cooperatively working CPUs.

2. A computerized method implemented by at least one processor within a computer system including:
a plurality of computer units, each of said plurality of computer units includes a plurality of computers, and each of the computers has at least one CPU and a control device which changes configuration of computers,
the computer system is adapted to include different configurations of computers in each of said plurality of computer units: a first computer configuration comprises at least two computers being successively disposed and closely coupled in a same computer unit, memories and I/O devices of the closely coupled computers are shared and CPUs of said at least two computers to function as a single computer; a second computer configuration comprises at least two computers which CPUs work to allow each of said at least two computers to function as a single computer independently,
the computer system further comprises a management server which performs:

in a first case that there is a free computer which is disposed successively adjacent to a plurality of computers having the first configuration and forming a first SMP combination within a first computer unit of said plurality of computer units, instructing said free computer to operate as an element of a second SMP combination to be scaled-up to from said first SMP combination with reference to the possible SMP combinations defined in the SMP definition information to increase a number of cooperatively working CPUs; and in a second case that there is a computer having the second configuration and performing an application, which is disposed successively adjacent to a plurality of computers having the first configuration and forming a first SMP combination within a first computer unit of said plurality of computer units, instructing a computer disposed in another computer unit than said first computer unit to perform said application on behalf of said computer having the second configuration, and instructing said computer having the second configuration to operate as an element of a second SMP combination to be scaled-up to from the first SMP combination with reference to the possible SMP combinations defined in the SMP definition information to increase number of cooperatively working CPUs.

3. A non-transitory computer-readable medium embodying a program implemented by at least one processor within a computer system including:

a plurality of computer units, each of said plurality of computer units includes a plurality of computers, and each of the computers has at least one CPU and a control device which changes configuration of computers, wherein the computer system is adapted to include different configurations of computers in each of said plurality of computer units: a first computer configuration comprises at least two computers being successively disposed and closely coupled in a same computer unit, memories and I/O devices of the closely coupled computers are shared and CPUs of said at least two computers cooperatively works to allow said at least two computers to function as a single computer; a second computer configuration comprises at least two computers which CPUs work to allow each of said at least two computers to function as a single computer independently, the computer system further comprises a management server, including SMP definition information defining allowable combinations of computers which construct possible SMP combinations in a single computer unit, wherein the program upon implemention, performs:

in a first case that there is a free computer which is disposed successively adjacent to a plurality of computers having the first configuration and forming a first SMP combination within a first computer unit of said plurality of computer units, instructing said free computer to operate as an element of a second SMP combination to be scaled-up to from said first SMP combination with reference to the possible SMP combinations defined in the SMP definition information to increase a number of cooperatively working CPUs; and in a second case that there is a computer having the second configuration and performing an application, which is disposed successively adjacent to a plurality of computers having the first configuration and forming a first SMP combination within a first computer unit of said plurality of computer units, instructing a computer disposed in another computer unit than said first computer unit to perform said application on behalf of said computer having the second configuration, and instructing said computer having the second configuration to operate as an element of a second SMP combination to be scaled-up to from the first SMP combination with reference to the possible SMP combinations defined in the SMP definition information to increase a number of cooperatively working CPUs.

4. The computer system according to claim 1, wherein said SMP definition information defines positions of said plurality of computers and said number of cooperatively working CPUs.

5. The computer system according to claim 1, wherein each of said plurality of computer units is defined by a computer chassis of a blade server.

6. The computer system according to claim 1, wherein when increasing a number of computers to which said first computer configuration is expansively allocated, an application is allocated to the computer which newly operates as an element of the second SMP combination.

7. The computer system according to claim 4, wherein the management server further comprises definition information defining application of the first computer configuration based on a performance requirement of the CPU.

8. The computerized method according to claim 2, wherein said SMP definition information defines positions of said plurality of computers and said number of cooperatively working CPUs.

9. The computerized method according to claim 2, wherein each of said plurality of computer units is defined by a computer chassis of a blade server.

10. The computerized method according to claim 2, wherein when increasing a number of computers to which said first computer configuration is expansively applied, an application is allocated to the computer which newly operates as an element of the second SMP combination.

11. The computerized method according to claim 8, wherein the management server further comprises definition information defining application of the first computer configuration based on a performance requirement of the CPU.

12. The non-transitory computer-readable medium according to claim 3, wherein said SMP definition information defines positions of said plurality of computers and said number of cooperatively working CPUs.

13. The non-transitory computer-readable medium according to claim 3, wherein each of said plurality of computer units is defined by a computer chassis of a blade server.

14. The non-transitory computer-readable medium according to claim 3, wherein when increasing a number of computers to which said first computer configuration is expansively applied, an application is allocated to the computer which newly operates as an element of the second SMP combination.

15. The non-transitory computer-readable medium according to claim 12, wherein the management server further comprises definition information defining application of the first computer configuration based on a performance requirement of the CPU.

* * * * *